(12) United States Patent
Ohno

(10) Patent No.: US 12,374,158 B2
(45) Date of Patent: Jul. 29, 2025

(54) IMAGE PROCESSING METHOD, IMAGE PROCESSING DEVICE, AND NON-TRANSITORY COMPUTER READABLE STORAGE MEDIUM

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: SWALLOW INCUBATE CO., LTD., Ibaraki (JP); PANASONIC HOLDINGS CORPORATION, Osaka (JP)

( * ) Notice: Subject to any disclaimer, the term of this patent is extended or adjusted under 35 U.S.C. 154(b) by 513 days.

(21) Appl. No.: 17/741,623

(22) Filed: May 11, 2022

(65) Prior Publication Data

US 2022/0270407 A1  Aug. 25, 2022

Related U.S. Application Data

(63) Continuation of application No. PCT/JP2020/004555, filed on Feb. 6, 2020.

(30) Foreign Application Priority Data

Nov. 14, 2019 (JP) ................................ 2019-206326

(51) Int. Cl.
 *G06V 40/19* (2022.01)
 *G06T 7/70* (2017.01)
 (Continued)

(52) U.S. Cl.
 CPC ............... *G06V 40/19* (2022.01); *G06T 7/70* (2017.01); *G06V 10/143* (2022.01); *G06V 10/24* (2022.01);
 (Continued)

(58) Field of Classification Search
 None
 See application file for complete search history.

(56) References Cited

U.S. PATENT DOCUMENTS

2009/0109400 A1  4/2009  Yoshinaga et al.
2009/0268944 A1  10/2009  Matsuoka et al.
(Continued)

FOREIGN PATENT DOCUMENTS

CN  109803583  5/2019
JP  2009-104524  5/2009
(Continued)

OTHER PUBLICATIONS

English Language machine translation KR-101914190-B1 to Ryoung (Year: 2018).*

(Continued)

*Primary Examiner* — David Ometz
(74) *Attorney, Agent, or Firm* — Wenderoth, Lind & Ponack, L.L.P.

(57) ABSTRACT

An image processing method includes: detecting a position of a facial feature point of a person from the image data; detecting a center position of a pupil of an eye of the person from the image data; detecting a horizontal component and a vertical component of an orientation of the face based on the position of the feature point; estimating a horizontal component of an eye gaze direction of the person with respect to an optical axis of the imaging device based on the horizontal component of the orientation of the face and a distance between the center position of the pupil and the position of the feature point; estimating a vertical component of the eye gaze direction based on at least the vertical component of the orientation of the face; and outputting eye gaze information including the horizontal component and the vertical component of the eye gaze direction.

9 Claims, 18 Drawing Sheets

(51) Int. Cl.
*G06V 10/143* (2022.01)
*G06V 10/24* (2022.01)
*G06V 40/16* (2022.01)
*G06V 40/18* (2022.01)

(52) U.S. Cl.
CPC .......... *G06V 40/166* (2022.01); *G06V 40/171* (2022.01); *G06V 40/174* (2022.01); *G06V 40/193* (2022.01); *G06T 2207/10048* (2013.01); *G06T 2207/30201* (2013.01)

(56) References Cited

U.S. PATENT DOCUMENTS

| | | | |
|---|---|---|---|
| 2013/0091515 A1 | 4/2013 | Sakata et al. | |
| 2015/0084858 A1 | 3/2015 | Murakami et al. | |
| 2017/0039411 A1* | 2/2017 | Ono | G06V 40/166 |
| 2017/0286771 A1* | 10/2017 | Ishii | A61B 3/113 |
| 2018/0260983 A1* | 9/2018 | Taoka | G06Q 30/06 |
| 2019/0065873 A1 | 2/2019 | Wang et al. | |
| 2021/0009150 A1 | 1/2021 | Chen et al. | |
| 2021/0049386 A1 | 2/2021 | Wang et al. | |
| 2021/0049387 A1 | 2/2021 | Wang et al. | |
| 2021/0049388 A1 | 2/2021 | Wang et al. | |

FOREIGN PATENT DOCUMENTS

| | | |
|---|---|---|
| JP | 2009-266086 | 11/2009 |
| JP | 2015-64513 | 4/2015 |
| JP | 2016-162234 | 9/2016 |
| JP | 2017-83308 | 5/2017 |
| JP | 2018-136770 | 8/2018 |
| KR | 101903127 B1 * | 10/2018 |
| KR | 101914190 B1 * | 11/2018 |
| WO | 2012/105196 | 8/2012 |

OTHER PUBLICATIONS

English Language machine translation KR-101903127-B1 to Byoung Chul Ko (Year: 2018).*

International Search Report issued Apr. 7, 2020 in International (PCT) Application No. PCT/JP2020/004555.

* cited by examiner

1B

IMAGE PROCESSING METHOD, IMAGE PROCESSING DEVICE, AND NON-TRANSITORY COMPUTER READABLE STORAGE MEDIUM

TECHNICAL FIELD

The present disclosure relates to a technique of detecting eye gaze information by image processing.

BACKGROUND ART

The eye gaze detection technique is used in various applications such as estimation of a person's interest target, estimation of a person's state such as drowsiness, and a user interface that performs input to equipment by an eye gaze. Since the eye gaze direction varies depending on the orientation of the user's face, the orientation of the face is considered in order to accurately detect the eye gaze direction.

For example, Patent Literature 1 discloses a technique of learning a correlation among a pupil position to the contour of the eye of the person, the direction of the face, and the eye gaze direction, applying the pupil position and face direction of the detection target to the correlation, estimating the pupil direction of the detection target, and calculating the eye gaze direction of the detection target based on the estimated pupil direction and the face direction of the detection target. Patent Literature 2 discloses a technique in which an orientation of a face is regarded as an eye gaze direction.

In the techniques of Patent Literatures 1 and 2, it is not considered at all that in calculating the horizontal component of the eye gaze direction and the vertical component of the eye gaze, the parameters contributing to the components are different, and hence, the techniques need further improvement in accurately detecting the eye gaze direction.

CITATION LIST

Patent Literature

Patent Literature 1: JP 2009-266086 A
Patent Literature 1: JP 2017-83308 A

SUMMARY OF INVENTION

An object of the present disclosure is to provide an image processing technique that can further improve detection accuracy of an eye gaze direction.

An image processing method according to one aspect of the present disclosure is an image processing method in an image processing device, the image processing method including: acquiring image data captured by an imaging device; detecting a position of a facial feature point of a person from the image data; detecting a center position of a pupil of an eye of the person from the image data; detecting a horizontal component and a vertical component of an orientation of the face based on the position of the feature point; estimating a horizontal component of an eye gaze direction of the person with respect to an optical axis of the imaging device based on the horizontal component of the orientation of the face and a distance between the center position of the pupil and the position of the feature point; estimating a vertical component of the eye gaze direction based on at least the vertical component of the orientation of the face; and outputting eye gaze information including the horizontal component and the vertical component of the eye gaze direction.

DESCRIPTION OF EMBODIMENTS

Findings Underlying Present Disclosure

Figure 1:
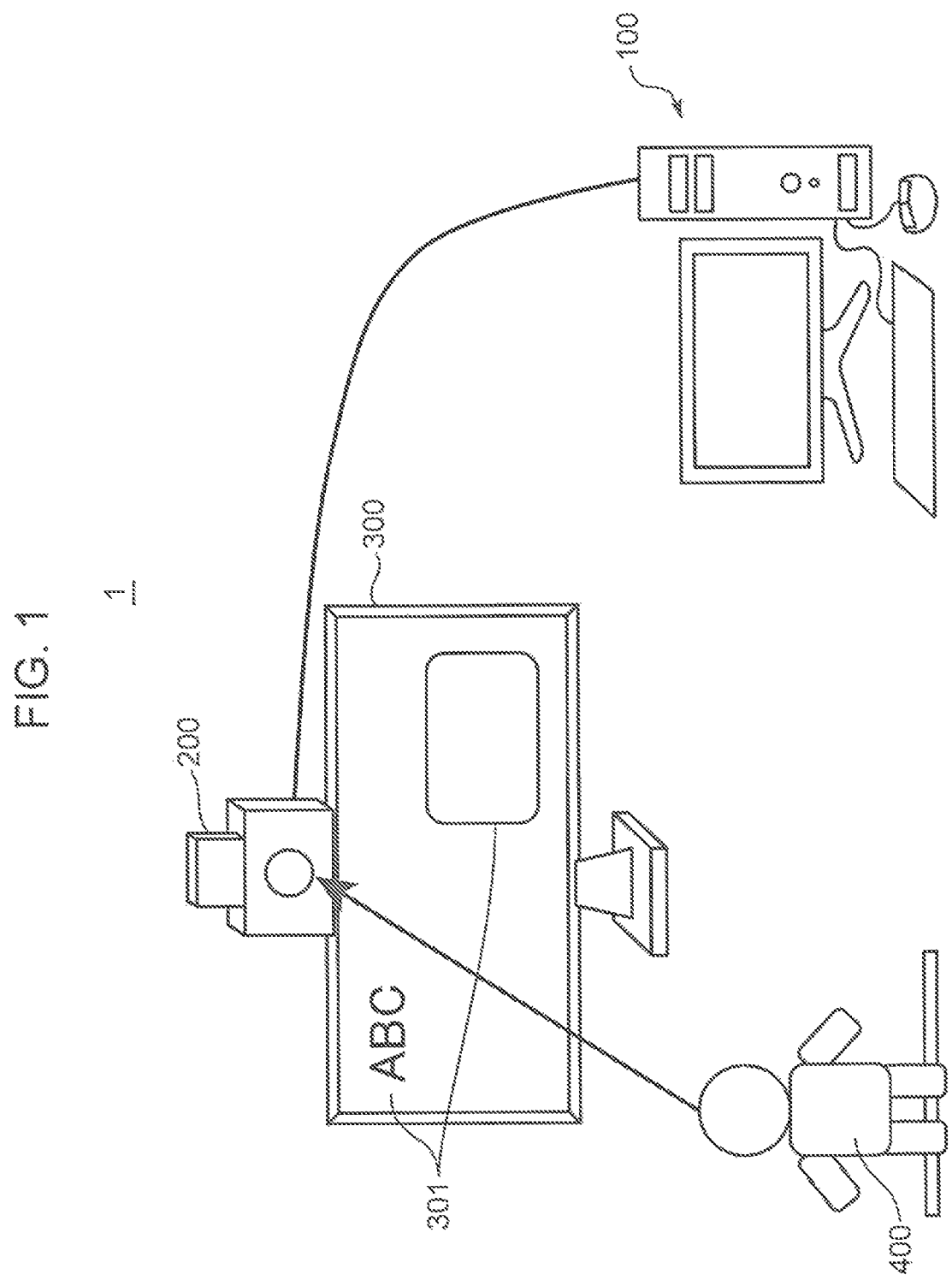
FIG. 1 is a view showing an example of an overall configuration of an image processing system according to a first embodiment of the present disclosure.

When an eye gaze point of a person is detected in a three-dimensional real space by using image data of a face of the person, it is required to detect an eye gaze direction with respect to an optical axis of a camera that captures the person, for example. As a parameter in a case where the eye gaze direction with respect to the optical axis of the camera is detected, for example, the orientation of the face with respect to the optical axis of the camera and the eye gaze direction with respect to the orientation of the face are used.

However, the eye gaze direction is formed of a three-dimensional vector. Therefore, in a case of detecting the eye gaze direction with respect to the optical axis, it is not sufficient to simply use the orientation of the face with respect to the optical axis of the camera and the eye gaze direction with respect to the orientation of the face, and it is required to divide the both into a horizontal component and a vertical component.

In Patent Literature 1, the eye gaze direction in the right-left direction is obtained from the sum of the face orientation in the right-left direction and the pupil direction in the right-left direction, and the eye gaze direction in the up-down direction is obtained from the sum of the face orientation in the up-down direction and the pupil direction in the up-down direction (paragraph [0073]).

However, Patent Literature 1 merely discloses that the pupil direction is calculated by applying the orientation of the face of the detection target and the position of the pupil of the detection target to the correlation learned from the position of the pupil with respect to the contour of the eye of the person, the orientation of the face, and the eye gaze direction. Therefore, in Patent Literature 1, there is no specific disclosure in which the pupil direction in the right-left direction and the pupil direction in the up-down direction are distinguished and calculated. Furthermore, there is no specific disclosure in which the face orientation in the right-left direction and the face orientation in the up-down direction are distinguished and calculated. Therefore, in Patent Literature 1, it is not considered at all that the parameters contributing to the calculation of each of the horizontal component and the vertical component of the eye gaze direction are different. Furthermore, in Patent Literature 1, it is also required to learn the correlation in advance, which is troublesome.

In Patent Literature 2, since the orientation of the face is regarded as the eye gaze direction, it is not considered at all that the parameters contributing to the calculation of each of the horizontal component and the vertical component of the eye gaze direction are different.

Thus, the techniques of Patent Literatures 1 and 2 are insufficient for accurately detecting the eye gaze direction.

Therefore, the present inventor has obtained a finding that parameters contributing to the calculation of each of the horizontal component and the vertical component of the eye gaze direction are different, and has conceived of the following aspects.

An image processing method according to one aspect of the present disclosure is an image processing method in an image processing device, the image processing method including: acquiring image data captured by an imaging device; detecting a position of a facial feature point of a person from the image data; detecting a center position of a pupil of an eye of the person from the image data; detecting a horizontal component and a vertical component of an orientation of the face based on the position of the feature point; estimating a horizontal component of an eye gaze direction of the person with respect to an optical axis of the imaging device based on the horizontal component of the orientation of the face and a distance between the center position of the pupil and the position of the feature point; estimating a vertical component of the eye gaze direction based on at least the vertical component of the orientation of the face; and outputting eye gaze information including the horizontal component and the vertical component of the eye gaze direction.

According to the present configuration, the horizontal component of the eye gaze direction with respect to the optical axis of the imaging device is estimated based on the horizontal component of the orientation of the face and the distance between the center position of the pupil and the facial feature point. The vertical component of the eye gaze direction with respect to the optical axis is estimated based on at least the vertical component of the orientation of the face. Thus, in the present configuration, the horizontal component and the vertical component of the eye gaze direction with respect to the optical axis are estimated using different parameters. Therefore, the present configuration can further improve the detection accuracy of the eye gaze direction. Furthermore, the present configuration does not require learning in advance of the above-described correlation. Therefore, the present configuration can detect the eye gaze direction with high accuracy with a small number of processing steps.

In the image processing method described above, the feature point may include an outer corner of the eye and an inner corner of the eye of the person.

According to the present configuration, since the outer corner of the eye and the inner corner of the eye are used as the facial feature point, the detection accuracy of the eye gaze direction can be further improved.

In the image processing method described above, in estimation of the horizontal component of the eye gaze direction, a horizontal component of a pupil direction that is a direction of the pupil with respect to the orientation of the face may be estimated based on a ratio of a first distance between the center position of the pupil and a position of the inner corner of the eye and a second distance between the center position of the pupil and a position of the outer corner of the eye, and a horizontal component of the eye gaze direction may be estimated by synthesizing the horizontal component of the orientation of the face and the horizontal component of the pupil direction.

According to the present configuration, the horizontal component of the pupil direction is estimated based on the ratio between the first distance between the center position of the pupil and the position of the inner corner of the eye and the second distance between the center position of the pupil and the position of the outer corner of the eye, the horizontal component of the pupil direction and the horizontal component of the orientation of the face are synthesized, and the horizontal component of the eye gaze direction is estimated. Thus, the estimation accuracy of the horizontal component of the eye gaze direction is enhanced, and the detection accuracy of the eye gaze direction can be further improved.

In the image processing method described above, the feature point may include a center position of the face.

According to the present configuration, since the center position of the face is used as a facial feature point, the detection accuracy of the eye gaze direction can be further improved.

In the image processing method described above, in estimation of the horizontal component of the eye gaze direction, a horizontal component of a pupil direction that is a direction of the pupil with respect to the orientation of the face may be estimated based on a deviation between a midpoint of the center position of each of the right and left pupils of the person and the center position of the face, and the horizontal component of the eye gaze direction may be estimated by synthesizing the horizontal component of the pupil direction and the horizontal component of the orientation of the face.

According to the present configuration, the horizontal component of the pupil direction is estimated based on the deviation between the midpoint of the center position of each of the right and left pupils and the center position of the face, the horizontal component of the pupil direction and the horizontal component of the orientation of the face are synthesized, and the horizontal component of the eye gaze direction is estimated. Thus, the estimation accuracy of the horizontal component of the eye gaze direction is enhanced, and the detection accuracy of the eye gaze direction can be further improved.

In the image processing method described above, in estimation of the vertical component of the eye gaze direction, the vertical component of the eye gaze direction may be estimated by further using a third distance between the center position of the pupil and an upper eyelid of the person and a fourth distance between the center position of the pupil and a lower eyelid of the person.

According to the present configuration, the vertical component of the eye gaze direction is estimated using the third distance between the center position of the pupil and the upper eyelid of the person and the fourth distance between the center position of the pupil and the lower eyelid of the person. Therefore, the vertical component of the eye gaze direction can be estimated more accurately.

In the image processing method described above, in estimation of the vertical component of the eye gaze direction, a vertical component of the pupil direction that is the direction of the pupil with respect to the orientation of the face may be estimated based on a ratio between the third distance and the fourth distance, and the vertical component of the eye gaze direction may be estimated by synthesizing the vertical component of the pupil direction and the vertical component of the orientation of the face.

According to the present configuration, the vertical component of the pupil direction is estimated based on the ratio between the third distance and the fourth distance, the vertical component of the pupil direction and the vertical component of the orientation of the face are synthesized, and the vertical component of the eye gaze direction is estimated. Thus, the estimation accuracy of the vertical component of the eye gaze direction is enhanced, and the detection accuracy of the eye gaze direction can be further improved.

In the image processing method described above, the feature point may include at least one of an eyebrow and a corner of a mouth, and a degree of interest of the person may be estimated based on the eye gaze information and at least one of a position of the eyebrow and a position of the corner of the mouth.

According to the present configuration, the degree of interest can be estimated with higher accuracy as compared with the case where the degree of interest is estimated based only on the eye gaze information.

The image processing method described above may include: estimating an expression of the person based on at least one of the position of the eyebrow and the position of the corner of the mouth; and estimating the degree of interest of the person based on the eye gaze information and information indicating the estimated expression.

According to the present configuration, since the degree of interest is estimated using the information indicating the expression of the person estimated based on at least one of the position of the eyebrow and the position of the corner of the mouth and the eye gaze information, the degree of interest of the person can be estimated with higher accuracy.

In the image processing method described above, the eye gaze information may include information indicating an eye gaze plane that is a region of a predetermined range with respect to an eye gaze point of the person on a predetermined target plane.

According to the present configuration, it is possible to appropriately determine the eye gaze target object without depending on the distance between the person and the eye gaze target object or the size of the eye gaze target object.

In the image processing method described above, the image data may be captured by a visible light camera, and the center position of the pupil may be a center position of an iris.

It is difficult to detect the pupil from the image data captured by the visible light camera, but the iris can be detected. In this aspect, since the center position of the iris is set as the center position of the pupil, the center position of the pupil can be accurately detected in a case where the visible light camera is used.

In the image processing method described above, the image data may be captured by an infrared light camera, and the center position of the pupil may be a center position of a pupil.

It is possible to detect the pupil from the image data captured by the infrared light camera. In this aspect, since the center position of the pupil is set as the center position of the pupil, the center position of the pupil can be accurately detected in a case where the infrared light camera is used.

In the image processing method described above, the image data may be image data captured by an infrared light camera using infrared light in a predetermined second wavelength band in which a spectral intensity of sunlight is attenuated more than a predetermined first wavelength.

According to the present configuration, the eye gaze direction can be accurately detected even outdoors where the spectral intensity of sunlight is strong.

The present disclosure can also be implemented as an image processing program for causing a computer to execute each characteristic configuration included in such an image processing method, or an image processing device operated by this image processing program. Furthermore, it goes without saying that such a computer program can be distributed via a computer-readable non-transitory recording medium such as a CD-ROM or a communication network such as the Internet.

Note that each of the embodiments described below shows a specific example of the present disclosure. Numerical values, shapes, constituent elements, steps, orders of steps, and the like shown in the following embodiments are merely examples, and are not intended to limit the present disclosure. Among the constituent elements in the following embodiments, constituent elements that are not described in independent claims indicating the highest concept are described as discretionary constituent elements. In addition, in all the embodiments, each of the contents can be combined.

First Embodiment

FIG. 1 is a view showing an example of an overall configuration of an image processing system 1 according to the first embodiment of the present disclosure. The image processing system 1 is a system that captures a person 400 and detects eye gaze information indicating an eye gaze of the person 400 from the obtained image data of the person 400. In the example of FIG. 1, the image processing system 1 specifies which object 301 the person 400 gazes at among a plurality of objects 301 displayed on a display device 300. However, this is an example, and the image processing system 1 may specify not only the object 301 displayed on the display screen of the display device 300 but also the object 301 gazed by the person 400 in the real space.

In the example of FIG. 1, the image processing system 1 is applied to a digital signage system. Therefore, the object

301 displayed on the display device 300 is an image of signage such as an advertisement.

The image processing system 1 includes an image processing device 100, a camera 200 (an example of an imaging device), and the display device 300. The image processing device 100 is connected to the camera 200 and the display device 300 via a predetermined communication path. The predetermined communication path is, for example, a wired communication path such as a wired LAN, or a wireless communication path such as a wireless LAN and Bluetooth (registered trademark). The image processing device 100 includes, for example, a computer installed around the display device 300. However, this is an example, and the image processing device 100 may include a cloud server. In this case, the image processing device 100 is connected to the camera 200 and the display device 300 via the Internet. The image processing device 100 detects eye gaze information of the person 400 from the image data of the person 400 captured by the camera 200, and outputs the eye gaze information to the display device 300. The image processing device 100 may be incorporated as hardware in the camera 200 or the display device 300. The camera 200 or the display device 300 may include a processor, and the image processing device 100 may be incorporated as software.

By capturing an image of an environment around the display device 300 at a predetermined frame rate, for example, the camera 200 acquires image data of the person 400 positioned around the display device 300. The camera 200 sequentially outputs the acquired image data to the image processing device 100 at a predetermined frame rate. The camera 200 may be a visible light camera or may be an infrared light camera.

The display device 300 includes a display device such as a liquid crystal panel or an organic EL panel. In the example of FIG. 1, the display device 300 is a signage display. Note that in the example of FIG. 1, the image processing system 1 is described to include the display device 300, but this is an example, and another piece of equipment may be adopted instead of the display device 300. For example, if the image processing system 1 is used as a user interface that receives an input to equipment by an eye gaze, the image processing system 1 may adopt home appliances such as a refrigerator, a television set, and a washing machine instead of the display device 300, for example. For example, if the image processing system 1 is mounted on a vehicle, a vehicle such as an automobile may be adopted instead of the display device 300. Furthermore, a storage device such as a hard disk drive or a solid state drive may be adopted instead of the display device 300.

Figure 2:
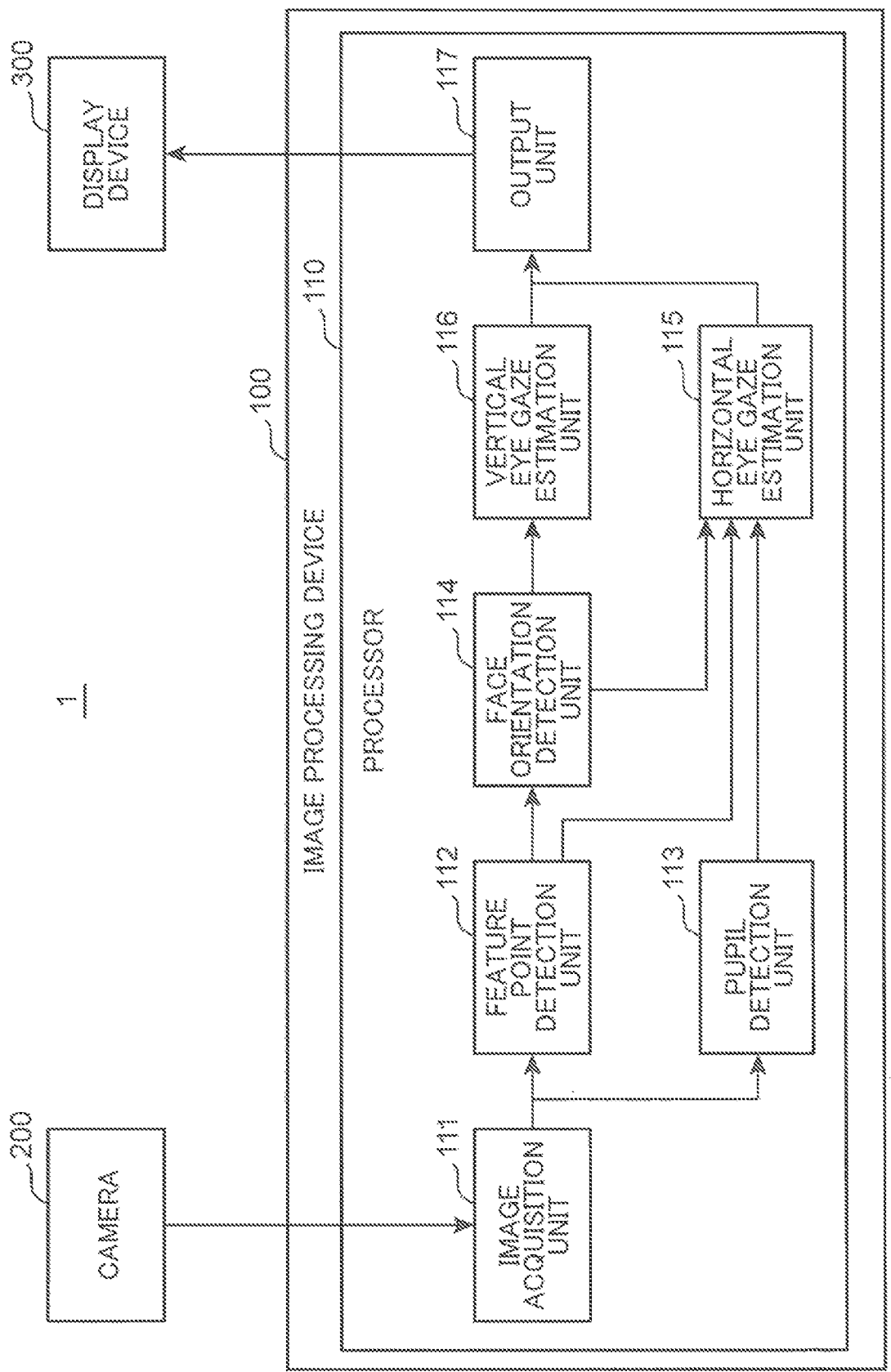
FIG. 2 is a block diagram showing an example of a detailed configuration of the image processing system according to the first embodiment.

FIG. 2 is a block diagram showing an example of a detailed configuration of the image processing system 1 according to the first embodiment. The image processing device 100 includes a processor 110. The processor 110 is an electric circuit such as a CPU or an FPGA. The processor 110 includes an image acquisition unit 111 (an example of an acquisition unit), a feature point detection unit 112, a pupil detection unit 113, a face orientation detection unit 114, a vertical eye gaze estimation unit 116, a horizontal eye gaze estimation unit 115, and an output unit 117. Each block included in the processor 110 may be implemented by the processor 110 executing an image processing program for causing a computer to function as an image processing device, or may be configured by a dedicated electric circuit. The explanation of each block described below is an outline of processing of each block, and details of the processing of each block will be described using a flowchart to be described later.

The image acquisition unit 111 acquires image data captured by the camera 200. Here, the acquired image data includes the face of the person 400 around the display device 300. Note that the image data acquired by the image acquisition unit 111 may be, for example, image data posted on a website or may be image data stored in an external storage device.

The feature point detection unit 112 detects the position of the facial feature point of the person 400 from the image data acquired by the image acquisition unit 111. The facial feature point is one or a plurality of points at characteristic positions in each of a plurality of parts constituting the face such as the outer corner of the eye, the inner corner of the eye, the contour of the face, the ridge of the nose, the corner of the mouth, and the eyebrow, for example. The feature point is also called a landmark. The feature point detection unit 112 is only required to detect a facial feature point by executing landmark detection processing using a model file of a framework of machine learning, for example.

Figure 7:
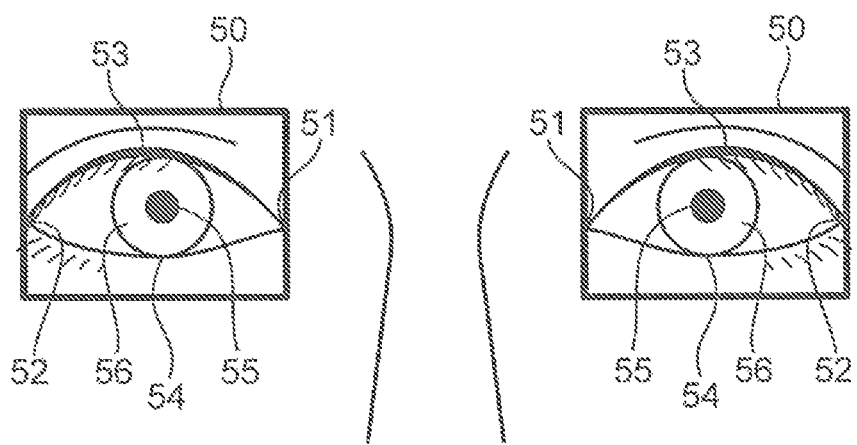
FIG. 7 is a view showing an eye region.

The pupil detection unit 113 detects the center position of the pupil of each of the left eye and the right eye of the person 400 from the image data acquired by the image acquisition unit 111. In the present embodiment, as shown in FIG. 7, the pupil refers to a colored part including a pupil 55 and a donut-like iris 56 surrounding the pupil 55.

The pupil detection unit 113 detects the pupil outer edge by applying pupil outer edge detection processing described later to the image data, and detects the center of the pupil outer edge as the center position of the pupil. In a case where the camera 200 is a visible light camera, it is difficult for the pupil outer edge detection processing to detect the outer edge of the pupil, but it is possible to detect the outer edge of the iris. Therefore, in the case where the camera 200 is a visible light camera, the center position of the pupil is the center position of the iris outer edge. In a case where the camera 200 is an infrared light camera, the pupil outer edge detection processing can detect the pupil outer edge. Therefore, in the case where the camera 200 is an infrared light camera, the center position of the pupil is the center position of the pupil outer edge.

The face orientation detection unit 114 detects a horizontal component and a vertical component of the orientation of the face with respect to the optical axis of the camera 200 based on the position of the feature point detected by the feature point detection unit 112. The face orientation horizontal component is an index indicating how much the orientation of the face is oriented to the left side or the right side in the horizontal direction with respect to the optical axis. The vertical component of the orientation of the face is an index indicating how much the orientation of the face is oriented to the upper side or the lower side in the vertical direction with respect to the optical axis. The horizontal direction is, for example, a direction parallel to the ground, and corresponds to the X axis of the image data captured by the camera 200. The vertical direction is, for example, a direction orthogonal to the ground, and corresponds to the Y axis of the image data captured by the camera 200.

Figure 3:
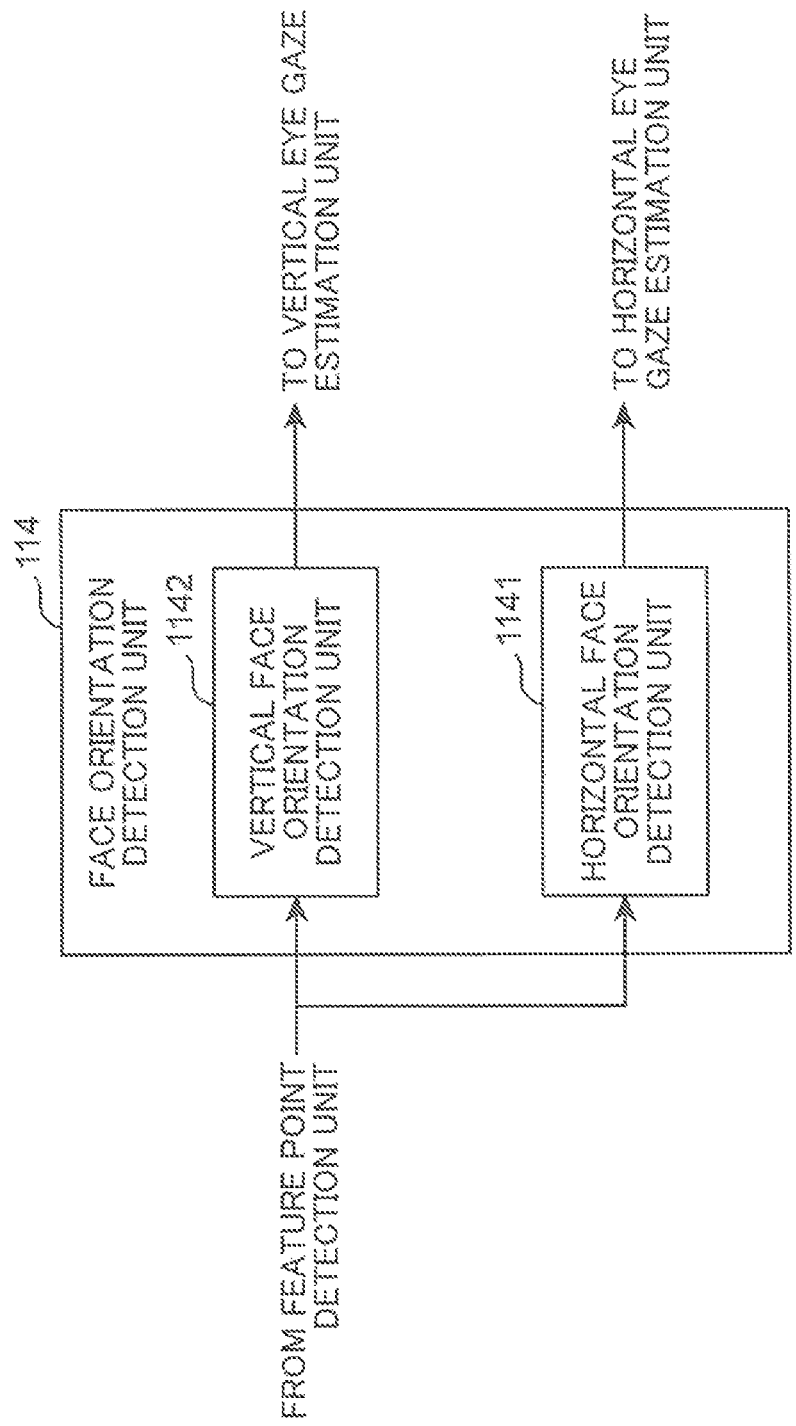
FIG. 3 is a block diagram showing a detailed configuration of a face orientation detection unit.

FIG. 3 is a block diagram showing a detailed configuration of a face orientation detection unit 114. The face orientation detection unit 114 includes a horizontal face orientation detection unit 1141 and a vertical face orientation detection unit 1142. The horizontal face orientation detection unit 1141 detects a horizontal component of the orientation of the face. The vertical face orientation detection unit 1142 detects a vertical component of the orientation of the face.

Refer back to FIG. 2. The horizontal eye gaze estimation unit 115 estimates a horizontal component of the eye gaze direction of the person 400 with respect to the optical axis based on the horizontal component of the orientation of the face detected by the face orientation detection unit 114 and the distance between the center position of the pupil detected by the pupil detection unit 113 and the position of the feature point detected by the feature point detection unit 112.

In the present embodiment, the feature point includes the outer corner and the inner corner of each of the right and left eyes. The processing of the horizontal eye gaze estimation unit 115 using the outer corner of the eye and the inner corner of the eye is as follows. The horizontal eye gaze estimation unit 115 calculates a first distance between the central position of the pupil and the inner corner of the eye. The horizontal eye gaze estimation unit 115 that has calculated the first distance calculates a second distance between the center position of the pupil and the position of the outer corner of the eye. The horizontal eye gaze estimation unit 115 that has calculated the second distance estimates a horizontal component of the pupil direction, which is the direction of the pupil with respect to the orientation of the face, based on the ratio between the first distance and the second distance. Then, the horizontal eye gaze estimation unit 115 synthesizes the estimated horizontal component of the pupil direction and the horizontal component of the orientation of the face to estimate the horizontal component of the eye gaze direction. The estimation processing using the outer corner of the eye and the inner corner of the eye is applied to each of the left eye and the right eye.

In the present embodiment, the feature point may include the center position of the face. The processing of the horizontal eye gaze estimation unit 115 using the center position of the face is as follows. The horizontal eye gaze estimation unit 115 detects a midpoint between the center position of each of the right and left pupils from the center position of each of the right and left pupils of the person 400. The horizontal eye gaze estimation unit 115 that has detected this midpoint detects a deviation between the center position of the face and the midpoint. The horizontal eye gaze estimation unit 115 that has detected this deviation estimates a horizontal component of the pupil direction based on this deviation. Hereinafter, the horizontal eye gaze estimation unit 115 is only required to estimate the horizontal component of the eye gaze direction similarly to the case of using the outer corner of the eye and the inner corner of the eye. The estimation processing using the center position of the face is applied to each of the left eye and the right eye.

The vertical eye gaze estimation unit 116 estimates a vertical component of the eye gaze direction of the person 400 with respect to the optical axis based on the vertical component of the orientation of the face detected by the face orientation detection unit 114. In the present embodiment, the vertical eye gaze estimation unit 116 estimates the vertical component of the orientation of the face as a vertical component of the eye gaze direction.

The output unit 117 generates eye gaze information including the horizontal component of the eye gaze direction estimated by the horizontal eye gaze estimation unit 115 and the vertical component of the eye gaze direction estimated by the vertical eye gaze estimation unit 116, and outputs the eye gaze information to the display device 300. The output unit 117 may calculate an eye gaze point on the display surface (target plane) of the display device 300 based on the eye gaze direction, and include this eye gaze point into the eye gaze information.

The output unit 117 having calculated the eye gaze point may acquire information of the object 301 displayed on the display device 300, specify the object 301 (gaze object) at which the person 400 gazes from the acquired information and the coordinate data of the eye gaze point, and output the specification result to the display device 300.

Since the camera 200 has been described with reference to FIG. 1, the description thereof is omitted here.

The display device 300 displays a marker indicating the eye gaze information output from the output unit 117, for example. In a case where the specification result of the eye gaze object is acquired from the output unit 117, the display device 300 may display a marker indicating the eye gaze object.

In a case where the image processing system 1 includes a home appliance instead of the display device 300, the home appliance receives an input of the person 400 from the eye gaze information. In a case where the image processing system 1 includes a storage device instead of the display device 300, the storage device stores the eye gaze information. In this case, the storage device may store the eye gaze information in association with a time stamp.

Figure 4:
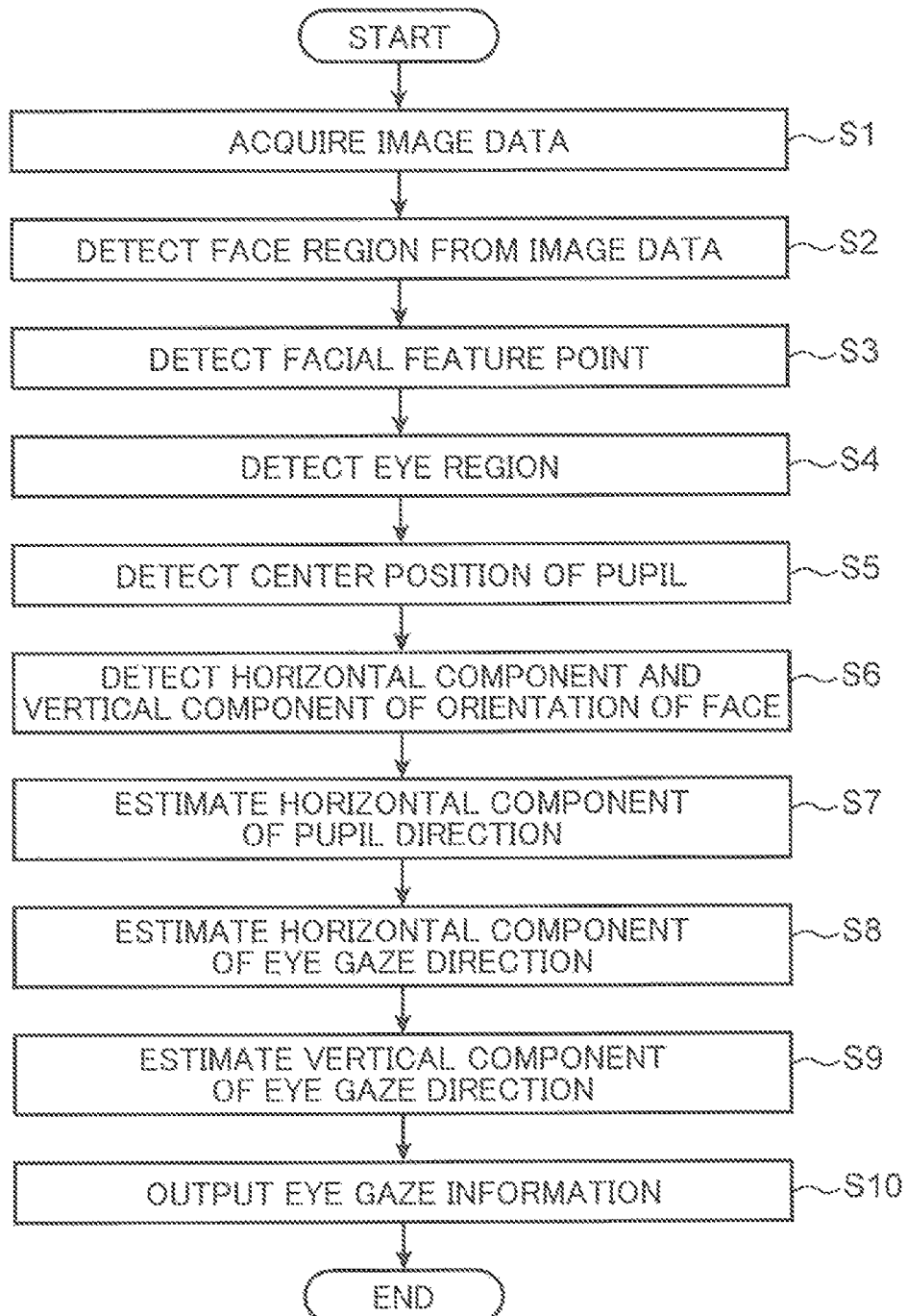
FIG. 4 is a flowchart showing an example of an operation of an image processing device according to the first embodiment.

Next, the operation of the image processing device 100 will be described. FIG. 4 is a flowchart showing an example of the operation of the image processing device 100 according to the first embodiment. In step S1, the image acquisition unit 111 acquires image data from the camera 200. In step S2, the feature point detection unit 112 detects a face region from the image data by inputting the image data to a classifier for detecting the face region. This classifier is a Haar-like cascade classifier created in advance for detecting the face region in an open-source image processing library, for example. The face region is a rectangular region having a size enough to include the entire face, for example. However, this is an example, and the shape of the face region may be, for example, a triangle, a pentagon, a hexagon, an octagon, or the like other than a rectangle. Note that the feature point detection unit 112 may detect the face region by pattern matching.

Figure 5:
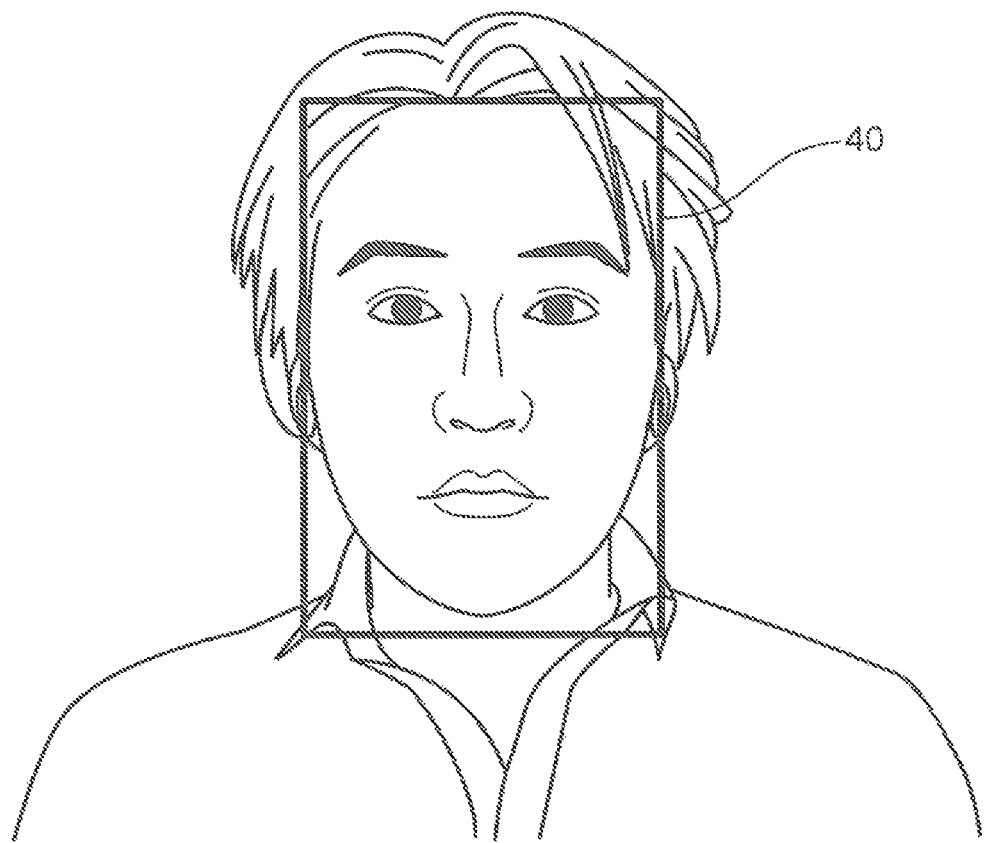
FIG. 5 is a view showing a face region.

FIG. 5 is a view showing a face region 40. As shown in FIG. 5, the feature point detection unit 112 detects, as the face region 40, a rectangular region including an upper part of the forehead, a lower part of the chin, and the hairline of the ears. Here, the face region 40 does not include the entire hair, but may be a region including the entire hair. In FIG. 5, since the image data includes the person 400 captured from the front, it includes the left eye and the right eye. In the present embodiment, for convenience of description, the right eye refers to the eye on the right side when the person 400 is viewed from the front, and the left eye refers to the eye on the left side when the person 400 is viewed from the front. However, this is an example, and the eye on the right side as viewed from the person 400 may be the right eye and the eye on the left side as viewed from the person 400 may be the left eye. In the present embodiment, the direction on the right side of the paper surface is defined as the right side, and the direction on the left side of the paper surface is defined as the left side.

Refer back to FIG. 4. In step S3, the above-described landmark detection processing is applied to the face region 40 detected in step S2, and detects a facial feature point.

Figure 6:
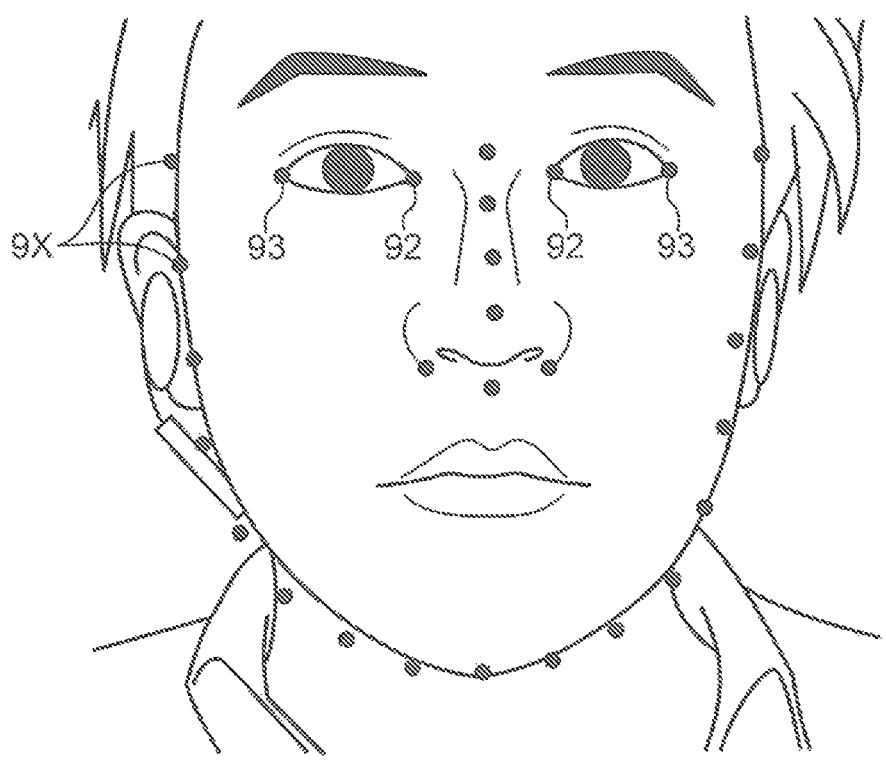
FIG. 6 is a view showing facial feature points set for a face region.

FIG. 6 is a view showing facial feature points 9X set for the face region 40. As shown in FIG. 6, the plurality of feature points 9X are detected from the face region 40 by applying the landmark detection processing to the face region 40. The example of FIG. 6 shows, among the feature points 9X detected by the landmark detection processing, the feature point 9X necessary for detection of the eye gaze information. In the example of FIG. 6, for example, five feature points 9X positioned on the ridge of the nose, for example, two feature points 9X positioned on the lower side of the nose, and, for example, 17 feature points 9X positioned on the contour of the face are detected. Furthermore, in the example of FIG. 6, two feature points 9X positioned at the left and right inner corners 92 of the eye and two feature points 9X positioned at the left and right outer corners 93 of the eye are detected. Note that a landmark point number is imparted to each of the feature points 9X, and it is predetermined which site of the face the feature point with which landmark point number indicates. For example, a landmark point number is set for each feature point 9X in such a manner that the feature point 9X with the landmark point number "2" indicates the left outer corner 93 of the eye, and the feature point with the landmark point number "0" indicates the left inner corner 92 of the eye. Therefore, from the landmark point number, the feature point detection unit 112 can specify which site of the face the feature point 9X indicates.

Refer back to FIG. 4. In step S4, the pupil detection unit 113 inputs the face region 40 detected in step S2 to a classifier for detecting the eye region, and detects the eye region. This classifier is a Haar-like cascade classifier created in advance for detecting the eye detection region in an open-source image processing library, for example. The eye region is a rectangular region having a size in which a predetermined margin is added to the size of the eye. However, this is an example, and the shape of the eye region may be, for example, a triangle, a pentagon, a hexagon, an octagon, or the like other than a rectangle. When the two eyes of the person 400 are included in the face region, the pupil detection unit 113 sets two eye regions 50 respectively corresponding to the two eyes. Note that the pupil detection unit 113 may set the eye region 50 by pattern matching. In the present embodiment, the eye refers to a region including the white of the eye and a colored part such as the iris that are surrounded by a boundary 53 of the upper eyelid and a boundary 54 of the lower eyelid as shown in FIG. 7.

FIG. 7 is a view showing the eye region 50. FIG. 7 indicates that the eye region 50 is a rectangular region including the entire area of the eye and having some margin added to the size of the eye. Note that the position at which the boundary of the eye region 50 is set with respect to the eye depends on the performance of the classifier. Therefore, the size of the eye region 50 varies depending on the performance of the classifier. For example, the upper boundary of the eye region 50 can extend to the vicinity of the eyebrow of the upper eyelid. In addition, the boundary on the nose side of the eye region 50 can extend to the vicinity of the nose, and the boundary on the ear side of the eye region 50 can extend to the vicinity of the temple. In the example of FIG. 7, since the face region 40 includes the right and left eyes, the pupil detection unit 113 sets two eye regions 50 corresponding respectively to the right eye and the left eye.

Figure 8:
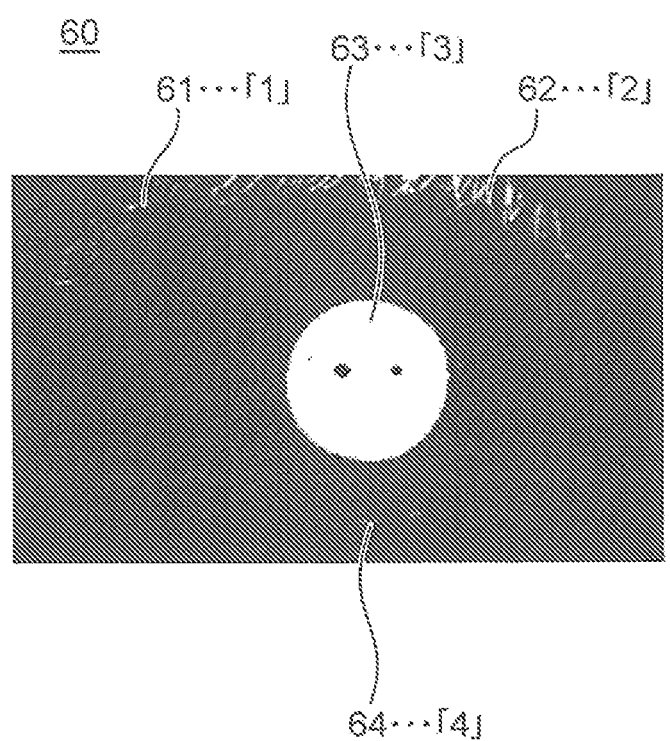
FIG. 8 is a view showing a binarized eye region.

Referring back to FIG. 4, in step S5, the pupil detection unit 113 detects the center position of the pupil from the eye region 50 detected in step S4. Details of the processing in step S5 will be described below. First, the pupil detection unit 113 binarizes the eye region 50. FIG. 8 is a view showing the eye region 50 having been binarized. Here, for example, a method called Otsu's binarization is adopted. In FIG. 8, a portion where the luminance is lower than a threshold is represented by white, and a portion where the luminance is equal to or higher than the threshold is represented by black.

Next, the pupil detection unit 113 performs labeling processing of imparting a labeling number to a white connected region appearing in the binarized eye region 50. In the example of FIG. 8, the left side of the upper eyelashes is regarded as one connected region 61, and a labeling number of "1" is imparted to the connected region 61. The right side of the upper eyelashes is regarded as one connected region 62, and a labeling number of "2" is imparted to the connected region 62. The pupil is regarded as one connected region 63, and a labeling number of "3" is imparted to the connected region 63. The lower eyelashes are regarded as one connected region 64, and a labeling number of "4" is imparted to the connected region 64.

Next, the pupil detection unit 113 determines whether or not a predetermined determination condition is satisfied for each of the labeled connected regions 61 to 64, and determines, as the pupil, the connected region satisfying the determination condition. As the determination condition, a condition of equal to or more than a predetermined pupil minimum area and equal to or less than a predetermined pupil maximum area can be adopted. The pupil minimum area is the minimum area of the pupil assumed in the image data, and the pupil maximum area is the maximum area of the pupil assumed in the image data. In a case where there is a plurality of connected regions satisfying the determination condition, the pupil detection unit 113 may determine, as the pupil, the connected region having the largest area, for example. Here, the connected region 63 is determined as the pupil.

Next, the pupil detection unit 113 detects the center of the pupil. Here, for example, the center of gravity of the connected region 63 of the pupil is detected as the center of the pupil.

The image shown in FIG. 8 is an image captured by an infrared light camera. In the image data captured by the infrared light camera, a large luminance change appears between the pupil and the iris. Therefore, in the example of FIG. 8, the connected region 63 of the pupil is detected by binarization. On the other hand, in the image data captured by a visible light camera, a large luminance change does not appear between the pupil and the iris, and a large luminance change appears at the boundary between the iris and the white of eye.

Therefore, for example, in a case where the camera 200 is an infrared light camera, the pupil detection unit 113 detects the pupil from the binarized eye region 50. On the other hand, for example, in a case where the camera 200 is a visible light camera, the pupil detection unit 113 detects the iris from the binarized eye region 50. In this case, the pupil detection unit 113 is only required to adopt, as the determination condition, a condition of equal to or more than a predetermined iris minimum area and equal to or less than a predetermined iris minimum area. The minimum iris area and the maximum iris area mentioned here do not refer to the area of the donut-like iris itself, but refer to the maximum area and the minimum area of a region including the pupil in the iris, i.e., the pupil. In this case, the pupil detection unit 113 is only required to detect the center of the iris. As the center of the iris, for example, the center of gravity of a connected region indicating the iris can be adopted.

Next, the pupil detection unit 113 executes pupil outer edge detection processing for detecting the outer edge of the pupil. As the pupil outer edge detection processing, pupil outer edge detection processing using a part of the method proposed by John G. Daugman (hereinafter, referred to as a "Daugman algorithm") is only required to be adopted. Daugman algorithm is disclosed in the document "High Confidence Visual Recognition of Persons by a Test of Statistical Independence: John G. Daugman (1993)".

Specifically, in the pupil outer edge detection processing, the pupil detection unit 113 first sets a circle having a predetermined pupil minimum radius with the center of the pupil detected from the binarized eye region 50 as the center of the circle. The pupil detection unit 113 next obtains a total value of the luminance on the circumference of the set circle by contour integral. The pupil detection unit 113 next obtains the total value of the luminance by performing the contour integral on a circle in which the radius of the circle set immediately before is radially expanded by one pixel. The pupil detection unit 113 next repeatedly executes this processing up to a predetermined pupil maximum radius. This gives a function indicating the relationship between the plurality of radii and the total value of the luminance corresponding to each of the plurality of radii. Next, the pupil detection unit 113 partially differentiates this function with respect to the radius, obtains the maximum change amount of the total value of the luminance of the adjacent radii, and detects, as the pupil outer edge, the circle of the radius at the position where the maximum change amount is detected. Next, the pupil detection unit 113 determines the center of the pupil outer edge as the center position of the pupil. Thus, the processing of step S5 ends.

Note that, in a case where the image data is image data captured by the visible light camera, the pupil detection unit 113 detects the iris outer edge by applying the pupil outer edge detection processing to the binarized eye region 50. Therefore, in a case where the image data is image data captured by the visible light camera, the center position of the pupil finally obtained in step S5 is the center position of the iris outer edge.

Conventionally, Haugh circle detection processing is widely used as the pupil outer edge detection processing. However, there is a case where the pupil of the person 400 included in the image data is not only a perfect circle but also distorted. In addition, there is also a case where the person 400 included in the image data narrows the eye and a case where the person 400 included in the image data turns the face sideways. In these cases, since the pupil is not a perfect circle, there is a possibility that the pupil outer edge cannot be accurately detected by Haugh circle detection processing.

Therefore, in the present embodiment, pupil outer edge detection processing using a part of Daugman algorithm is adopted. This enhances, in the present embodiment, robustness with respect to the pupil outer edge detection processing in various cases such as a case where the pupil is distorted from a perfect circle, a case of a narrowed eye, and a case of turning the face sideways.

Refer back to FIG. 4. In step S6, the horizontal face orientation detection unit 1141 detects the horizontal component of the orientation of the face based on the facial feature point detected in step S3. Furthermore, in step S6, the vertical face orientation detection unit 1142 detects the vertical component of the orientation of the face based on the facial feature point detected in step S3.

Figure 9:
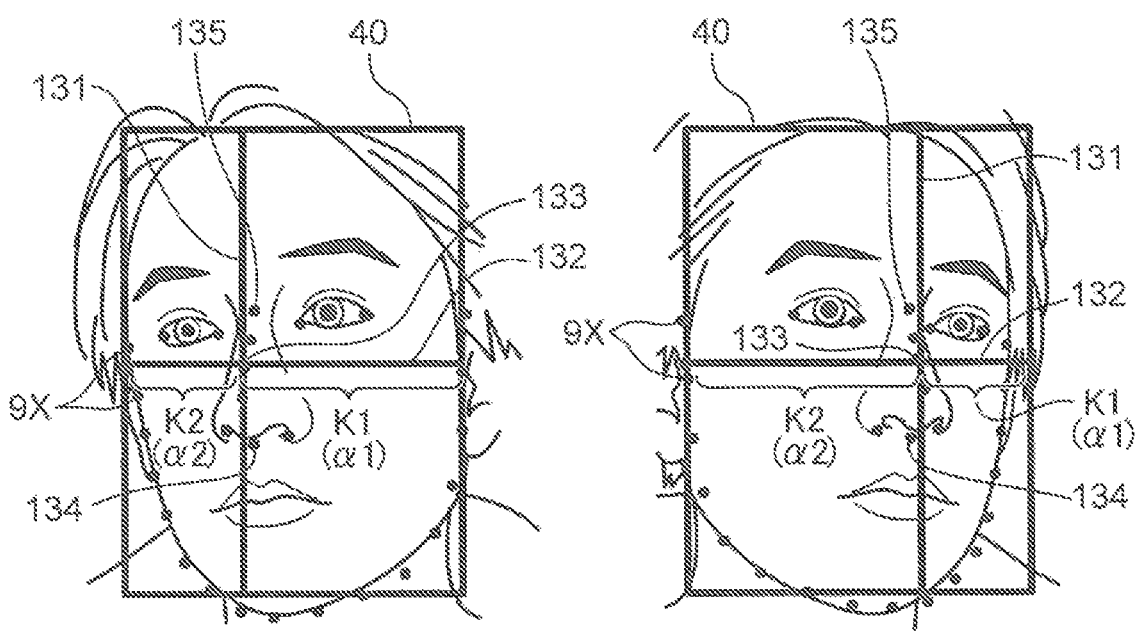
FIG. 9 is an explanatory view of processing for detecting a horizontal component of an orientation of a face.

Details of the processing of the horizontal component of the orientation of the face are as follows. FIG. 9 is an explanatory view of processing for detecting a horizontal component of the orientation of the face. The left view of FIG. 9 shows a state in which the face is oriented leftward. The right view of FIG. 9 shows a state in which the face is oriented rightward.

Refer to the left view of FIG. 9. First, the horizontal face orientation detection unit 1141 sets a vertical center line 131 in the vertical direction and a horizontal center line 132 in the horizontal direction from the facial feature point 9X set in the face region 40. For example, the horizontal face orientation detection unit 1141 is only required to set, as the vertical center line 131, a straight line that passes through a feature point 133 indicating the center of the ridge of the nose and is parallel to the vertical side of the face region 40. The feature point 133 is, for example, the third feature point 9X from the top among the five feature points 9X indicating the ridge of the nose. For example, the horizontal face orientation detection unit 1141 is only required to set, as the horizontal center line 132, a straight line that passes through the feature point 133, for example, and is parallel to the horizontal side of the face region 40. The description has been given assuming that the vertical center line and the horizontal center line pass through the feature point 133 at the center of the ridge of the nose. However, the vertical center line 131 and the horizontal center line 132 may be set to pass through a feature point 134 at the lower end of the ridge of the nose, for example, or may be set to pass through a feature point 135 at the upper end of the ridge of the nose.

Next, the horizontal face orientation detection unit 1141 sections the horizontal center line 132 by the feature point 133, and obtains a length of a right section K1 and a length of a left section K2. Next, the horizontal face orientation detection unit 1141 obtains a ratio between the right section K1 and the left section K2 where the length of the horizontal center line 132 is set to 100%, and obtains a horizontal component of the orientation of the face based on this ratio. For example, the ratio of the right section K1 is $\alpha 1$, the ratio of the left section K2 is $\alpha 2$, and the right side is positive. In this case, as shown in the left view of FIG. 9, if the ratio $\alpha 2$ is smaller than the ratio $\alpha 1$, the horizontal face orientation detection unit 1141 determines that the face is oriented leftward. As shown in the right view of FIG. 9, if the ratio $\alpha 1$ is smaller than the ratio $\alpha 2$, the horizontal face orientation detection unit 1141 determines that the face is oriented rightward. If the ratio $\alpha 2$ is substantially equal to the ratio $\alpha 1$, the horizontal face orientation detection unit 1141 determines that the face is oriented to the front. The description "substantially equal" means that a slight difference between the ratio $\alpha 2$ and the ratio $\alpha 1$ is allowed. For example, if both the ratio $\alpha 2$ and the ratio $\alpha 1$ are within the range of plus or minus Aa with respect to 50%, the horizontal face orientation detection unit 1141 is only required to determine that the face is oriented to the front. An example of $\Delta \alpha$ is 2%, 5%, 8%, 10%, or the like.

Next, the horizontal face orientation detection unit 1141 subtracts the smaller one of the ratio $\alpha 1$ and the ratio $\alpha 2$ from 50. For example, as shown in the left view of FIG. 9, if the ratio $\alpha 2$ is smaller than the ratio $\alpha 1$, the horizontal face orientation detection unit 1141 obtains $50-\alpha 2$. As shown in the right view of FIG. 9, if the ratio $\alpha 1$ is smaller than the ratio $\alpha 2$, the horizontal face orientation detection unit 1141 obtains $50-\alpha 1$. Next, if the face is oriented rightward, the right side is positive, and hence the horizontal face orientation detection unit 1141 calculates $50-\alpha 1$ as a horizontal component of the orientation of the face. On the other hand, if the face is oriented leftward, the left side is negative, and hence the horizontal face orientation detection unit 1141 calculates $-(50-\alpha 2)$ as a horizontal component of the orientation of the face.

Thus, as the value of the horizontal component of the orientation of the face increases in the positive direction, it indicates that the orientation of the face is more rightward.

As the value of the horizontal component of the orientation of the face increases in the negative direction, it indicates that the orientation of the face is more leftward. If the horizontal component of the orientation of the face is 0, it indicates that the face orientation is the front direction. Thus, the horizontal component of the orientation of the face is calculated. The method for obtaining the horizontal component of the orientation of the face is not limited to the above-described method, and any method may be adopted as long as the horizontal component of the orientation of the face can be calculated. For example, as the horizontal component of the face orientation, a value obtained by subtracting 50 from a value of the larger one of the ratio α1 and the ratio α2 may be adopted. In addition, the horizontal component of the orientation of the face may be positive on the left side.

Figure 10:
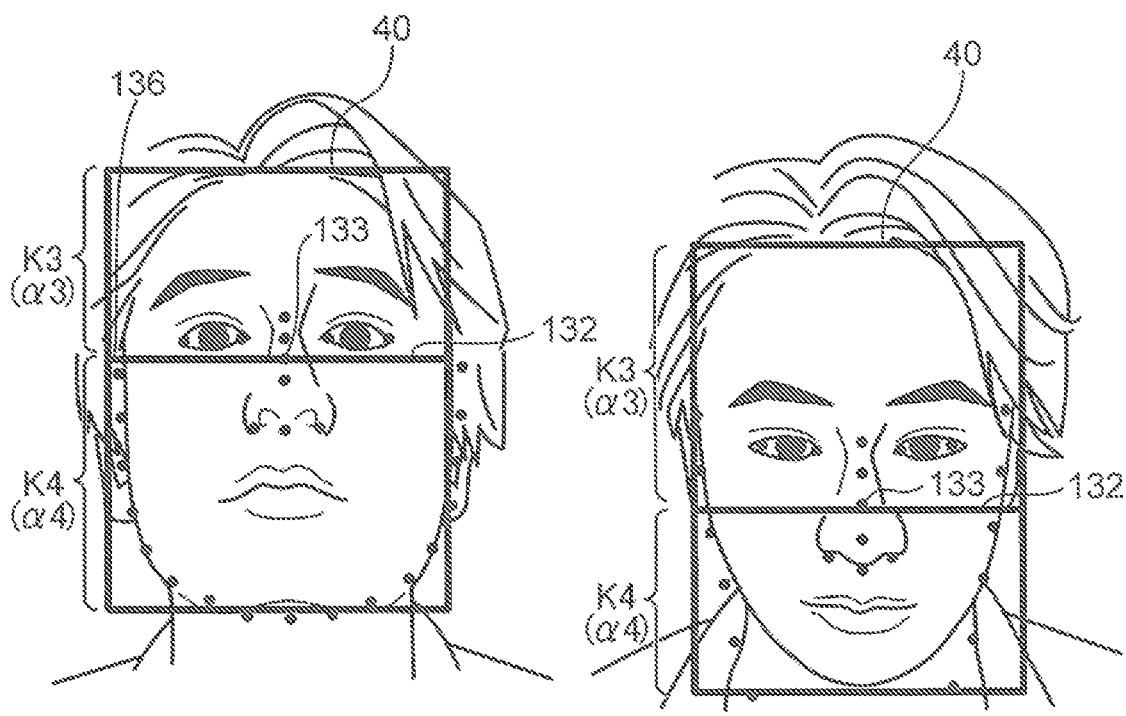
FIG. 10 is an explanatory view of processing for detecting a vertical component of an orientation of a face.

Next, the vertical component of the orientation of the face will be described. FIG. 10 is an explanatory view of processing for detecting a vertical component of the orientation of the face. The left view of FIG. 10 shows a state in which the face is oriented upward. The right view of FIG. 10 shows a state in which the face is oriented downward.

Refer to the left view of FIG. 10. First, the vertical face orientation detection unit 1142 sets, as the face region 40, a horizontal center line 132, which is a straight line that passes through the feature point 133 indicating the center of the ridge of the nose and is parallel to the horizontal side of the face region 40. Note that the horizontal center line 132 may be set to a feature point of the ridge of the nose other than the feature point 133. A setting result of the horizontal face orientation detection unit 1141 may be used to set the horizontal center line 132.

Next, the vertical face orientation detection unit 1142 sections the vertical side of the face region 40 at an intersection point 136 between the vertical side and the horizontal center line 132, and obtains a length of an upper section K3 and a length of a lower section K4. Next, the vertical face orientation detection unit 1142 obtains a ratio between the upper section K3 and the lower section K4 where the length of the vertical side is set to 100%, and obtains a vertical component of the orientation of the face based on this ratio. For example, the ratio of the upper section K3 is α3, the ratio of the lower section K4 is α4, and the upper side is positive. In this case, as shown in the left view of FIG. 10, if the ratio α3 is smaller than the ratio α4, the vertical face orientation detection unit 1142 determines that the face is oriented upward. As shown in the right view of FIG. 10, if the ratio α4 is smaller than the ratio α3, the vertical face orientation detection unit 1142 determines that the face is oriented downward. If the ratio α3 is substantially equal to the ratio α4, the vertical face orientation detection unit 1142 determines that the face is oriented to the front. That the ratio α3 and the ratio α4 are substantially equal have the same meaning as that the ratio α1 and the ratio α2 are substantially equal.

Next, the vertical face orientation detection unit 1142 subtracts the smaller one of the ratio α3 and the ratio α4 from 50. For example, as shown in the left view of FIG. 10, if the ratio α3 is smaller than the ratio α4, the vertical face orientation detection unit 1142 obtains 50−α3. As shown in the right view of FIG. 10, if the ratio α4 is smaller than the ratio α3, the vertical face orientation detection unit 1142 obtains 50−α4. Next, if the face is oriented upward, the upper side is positive, and hence the vertical face orientation detection unit 1142 calculates 50−α3 as a vertical component of the orientation of the face. On the other hand, if the face is oriented downward, the upper side is positive, and hence the vertical face orientation detection unit 1142 calculates −(50−α4) as a vertical component of the orientation of the face.

Thus, as the value of the vertical component of the orientation of the face increases in the positive direction, it indicates that the orientation of the face is more upward. As the value of the vertical component of the orientation of the face increases in the negative direction, it indicates that the orientation of the face is more downward. If the vertical component of the orientation of the face is 0, it indicates that the face orientation is the front direction. Thus, the vertical component of the orientation of the face is calculated. The method for obtaining the vertical component of the orientation of the face is not limited to the above-described method, and any method may be adopted as long as the vertical component of the orientation of the face can be calculated. For example, as the vertical component of the face orientation, a value obtained by subtracting 50 from a value of the larger one of the ratio α3 and the ratio α4 may be adopted. In addition, the vertical component of the orientation of the face may be set to positive on the lower side.

Refer back to FIG. 4. In step S7, the horizontal eye gaze estimation unit 115 estimates a horizontal component of the pupil direction using the outer corner of the eye and the inner corner of the eye detected as the facial feature point in step S3 and the center position of the pupil detected in step S5.

Figure 11:
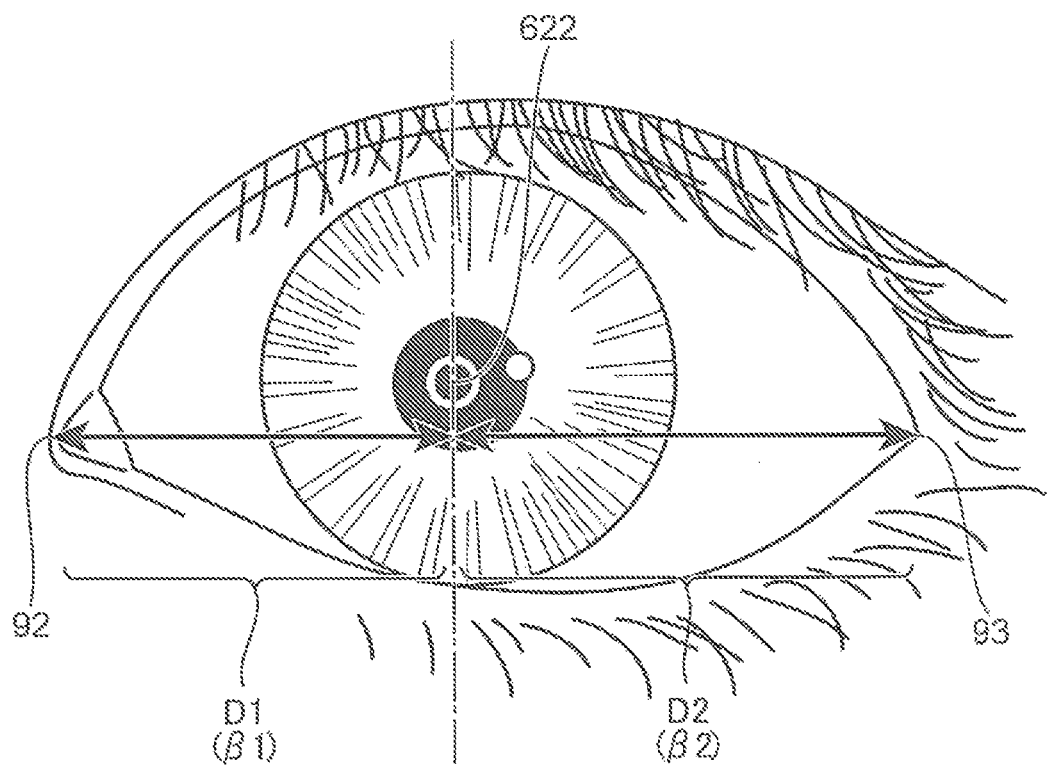
FIG. 11 is an explanatory view of a first example of processing for detecting a horizontal component of a pupil direction.

FIG. 11 is an explanatory view of the first example of processing for detecting a horizontal component of the pupil direction. FIG. 11 shows the right eye. In the first example, the horizontal component of the pupil direction is calculated using the outer corner of the eye and the inner corner of the eye. First, the horizontal eye gaze estimation unit 115 calculates a first distance D1, which is a distance in the X direction between the inner corner 92 of the eye and a center position 622 of the pupil. The horizontal eye gaze estimation unit 115 calculates a second distance D2, which is a distance in the X direction between the outer corner 93 of the eye and the center position 622 of the pupil. In this case, the first distance D1 is calculated as an absolute value of a difference between the X coordinate of the inner corner 92 of the eye and the X coordinate of the center position 622 of the pupil. The second distance D2 is calculated as an absolute value of a difference between the X coordinate of the outer corner 93 of the eye and the X coordinate of the center position 622 of the pupil. Next, the horizontal eye gaze estimation unit 115 calculates a ratio β1 and a ratio β2 of the first distance D1 and the second distance D2 where the distance between the X coordinate of the inner corner 92 of the eye and the X coordinate of the outer corner 93 of the eye is set to 100%. The above-described processing is executed for each of the right and left eyes.

Figure 12:
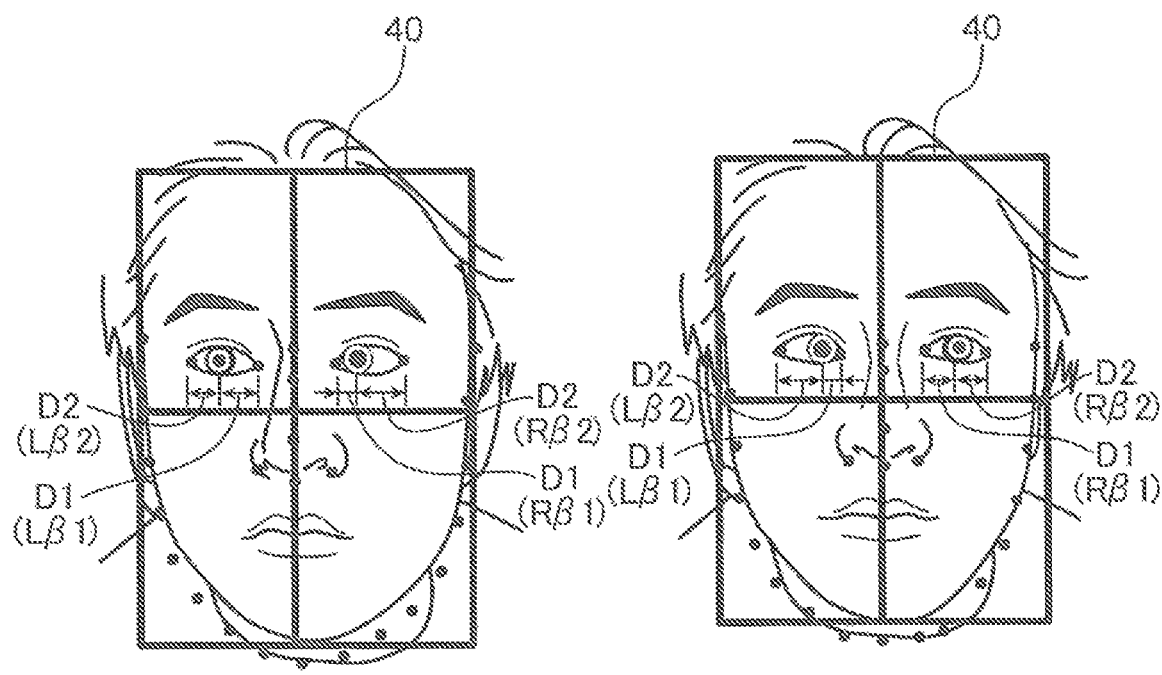
FIG. 12 is an explanatory view following FIG. 11.

FIG. 12 is an explanatory view following FIG. 11. The left view of FIG. 12 shows a state in which the face is oriented substantially to the front and the pupil is oriented leftward. The right view of FIG. 12 shows a state in which the face is oriented substantially to the front and the pupil is oriented rightward. In FIG. 12, Lβ1 and Lβ2 indicate the ratio of the first distance D1 and the second distance D2 of the left eye, and Rβ1 and Rβ2 indicate the ratio of the first distance D1 and the second distance D2 of the right eye.

In the left view of FIG. 12, the right and left pupils are set on the left. Therefore, the second distance D2 is short for the left eye, and the first distance D1 is short for the right eye. In the right view of FIG. 12, the right and left pupils are set on the right. Therefore, the second distance D2 is long for the left eye, and the first distance D1 is long for the right eye.

Based on the above, the horizontal component of the pupil direction is calculated as follows. Hereinafter, a case where the pupil is set on the right is defined as positive. The horizontal eye gaze estimation unit 115 determines whether the pupil is set on the left or set on the right. In this case, focusing on, for example, the right eye, the horizontal eye gaze estimation unit 115 is only required to determine that the pupil is set on the left if the ratio $R\beta 1$ is smaller than the ratio $R\beta 2$, and determine that the pupil is set on the right if the ratio $R\beta 2$ is smaller than the ratio $R\beta 1$. When focusing on the left eye, the horizontal eye gaze estimation unit 115 is only required to determine that the pupil is set on the left if the ratio $L\beta 2$ is smaller than the ratio $L\beta 1$, and determine that the pupil is set on the right if the ratio $L\beta 1$ is smaller than the ratio $L\beta 2$.

When the pupil is set on the left, as shown in the left view of FIG. 12, the horizontal eye gaze estimation unit 115 calculates a mean value of the ratio $L\beta 2$ of the second distance D2 of the left eye and the ratio $R\beta 1$ of the first distance D1 of the right eye, and calculates, as the horizontal component of the pupil direction, a value obtained by subtracting this mean value from 50 and multiplying the obtained value by minus. The mean value is calculated because there is no large difference in the pupil direction between the right and left eyes. The mean value is subtracted from 50 for the purpose of increasing the value of the horizontal component of the pupil direction as the pupil is set on the left or right from the front of the face. Minus is multiplied for the purpose of making the right positive.

When the pupil is set on the right, as shown in the right view of FIG. 12, the horizontal eye gaze estimation unit 115 calculates a mean value of the ratio $L\beta 1$ of the first distance D1 of the left eye and the ratio $R\beta 2$ of the second distance D2 of the right eye, and calculates, as the horizontal component of the pupil direction, a value obtained by subtracting this mean value from 50.

This indicates that the pupil is oriented more rightward with respect to the front face as the value of the horizontal component of the pupil direction increases in the plus direction, and indicates that the pupil is oriented more leftward with respect to the front face as the value of the horizontal component of the pupil direction increases in the minus direction. In addition, when the horizontal component of the pupil direction is 0, it indicates that the pupil is oriented to the front of the face. Thus, the horizontal component of the pupil direction is calculated. The method for obtaining the horizontal component of the pupil direction is not limited to the above-described method, and any method may be adopted as long as the horizontal component of the pupil direction can be calculated. For example, in the above example, the ratio of the smaller one of the ratio $\beta 1$ and the ratio $\beta 2$ is used, but the ratio of the larger one of the ratio $\beta 1$ and the ratio $\beta 2$ may be used. In this case, the horizontal component of the pupil direction may be calculated by subtracting 50 from the larger ratio. In addition, the horizontal component of the pupil direction may be set to positive on the left side.

Figure 13:
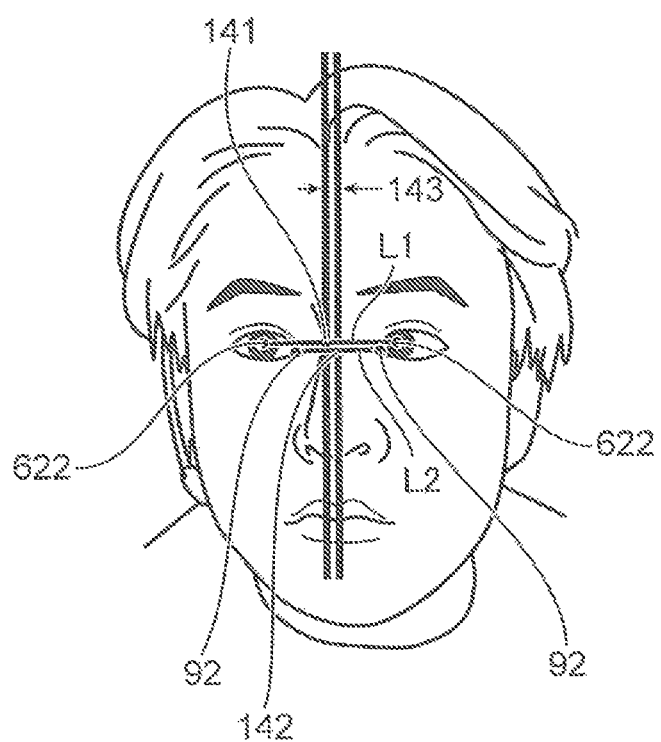
FIG. 13 is an explanatory view of a second example of processing for detecting a horizontal component of a pupil direction.

Next, the second example of processing for detecting a horizontal component of the pupil direction will be described. In the second example, the horizontal component of the pupil direction is detected using the center position of the face. FIG. 13 is an explanatory view of the second example of the detection processing of the horizontal component of the pupil direction. The horizontal eye gaze estimation unit 115 detects, as a center position 142 of the face, a midpoint of a line segment L2 connecting the X coordinate of the inner corner 92 of the left eye and the X coordinate of the inner corner 92 of the right eye. Next, the horizontal eye gaze estimation unit 115 detects a midpoint 141 of a line segment L1 connecting the X coordinate of the center position 622 of the left pupil and the X coordinate of the center position of the right pupil.

Next, the horizontal eye gaze estimation unit 115 detects a deviation 143 between the midpoint 141 and the center position 142 as a horizontal component of the pupil direction. For example, when the right side is positive, in a case where the midpoint 141 is positioned on the left side with respect to the center position 142, a value obtained by adding a minus to the absolute value of the deviation is detected as the horizontal component of the pupil direction. When the midpoint 141 is positioned on the right with respect to the center position 142, the absolute value of the deviation is detected as a horizontal component of the pupil direction. Thus, the horizontal component of the pupil direction is calculated.

Refer back to FIG. 4. In step S8, the horizontal eye gaze estimation unit 115 synthesizes the horizontal component of the orientation of the face detected in step S6 and the horizontal component of the pupil direction detected in step S7, and estimates the horizontal component of the eye gaze direction. For example, the horizontal component of the eye gaze direction is calculated by weighting and adding the horizontal component of the orientation of the face and the horizontal component of the pupil direction using a predetermined weighting coefficient. However, this is an example, and the horizontal component of the eye gaze direction may be calculated by adding the horizontal component of the orientation of the face and the horizontal component of the pupil direction without weighting.

Figure 14:
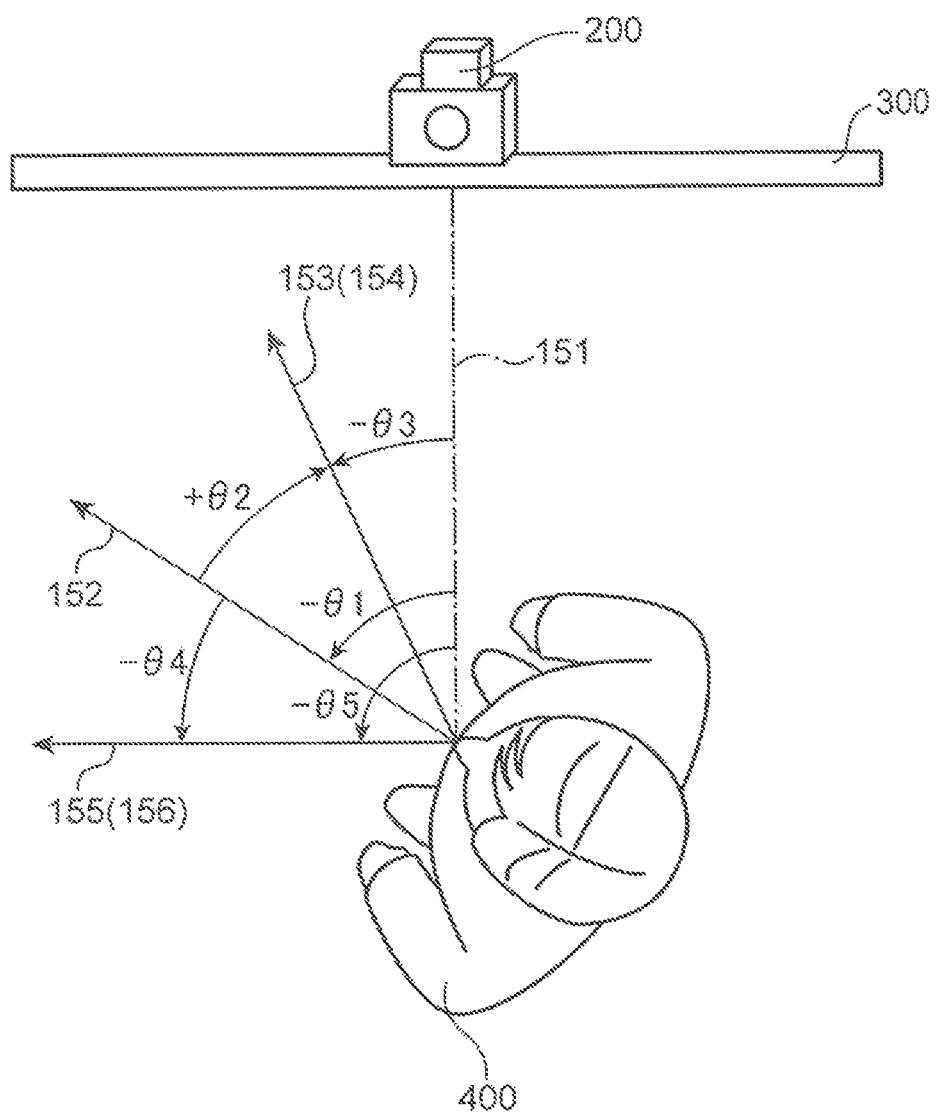
FIG. 14 is a view showing a relationship among an optical axis, an orientation of a face, a pupil direction, and an eye gaze direction.

FIG. 14 is a view showing a relationship among an optical axis 151, an orientation 152 of the face, a pupil direction 153, and an eye gaze direction 154. The example of FIG. 14 shows a state in which the person 400 is viewed from above.

In the example of FIG. 14, the orientation 152 of the face is in a counterclockwise direction with respect to the optical axis 151. In the example of FIG. 14, the counterclockwise direction is minus, and the clockwise direction is plus. In the example of FIG. 14, the orientation 152 of the face is in a counterclockwise direction with respect to the optical axis 151. Therefore, the horizontal component of the orientation 152 of the face with reference to the optical axis 151 has a value corresponding to an angle $(-\theta 1)$ between the optical axis 151 and the orientation 152 of the face. The pupil direction 153 is in a clockwise direction with respect to the orientation 152 of the face. Therefore, the horizontal component of the pupil direction 153 with reference to the orientation 152 of the face has a value corresponding to an angle $(+\theta 2)$ between the orientation 152 of the face and the pupil direction 153. Therefore, the horizontal component of the eye gaze direction 154 with reference to the optical axis 151 has a value corresponding to an angle $(-\theta 3 = -\theta 1 + \theta 2)$ between the optical axis 151 and the pupil direction 153.

On the other hand, it is assumed that the pupil is oriented to a pupil direction 155. In this case, the pupil direction 155 is in a counterclockwise direction with respect to the orientation 152 of the face. Therefore, the horizontal component of the pupil direction 155 with reference to the orientation 152 of the face has a value corresponding to an angle $(-\theta 4)$ between the orientation 152 of the face and the pupil direction 155. Therefore, the horizontal component of an eye gaze direction 156 with reference to the optical axis 151 has a value corresponding to an angle $(-\theta 5 = -\theta 1 - \theta 4)$ between the optical axis 151 and the pupil direction 155.

Refer back to FIG. 4. In step S9, the vertical eye gaze estimation unit 116 estimates the vertical component of the orientation of the face detected in step S6 as a vertical component of the eye gaze direction.

In step S10, the output unit 117 generates eye gaze information including the horizontal component of the eye gaze direction estimated in step S8 and the vertical component of the eye gaze direction estimated in step S9, and outputs the eye gaze information to the display device 300.

Thus, according to the present embodiment, the horizontal component of the eye gaze direction with respect to the optical axis is estimated by synthesizing the horizontal component of the orientation of the face and the horizontal component of the pupil direction. The vertical component of the eye gaze direction with respect to the optical axis is estimated based on the vertical component of the orientation of the face. Thus, in the present embodiment, the horizontal component and the vertical component of the eye gaze direction with respect to the optical axis are estimated using different parameters. Therefore, the present embodiment can further improve the detection accuracy of the eye gaze direction. Furthermore, the present embodiment does not require learning in advance of the above-described correlation. Therefore, the present embodiment can detect the eye gaze direction with high accuracy with a small number of processing steps.

Second Embodiment

Figure 15:
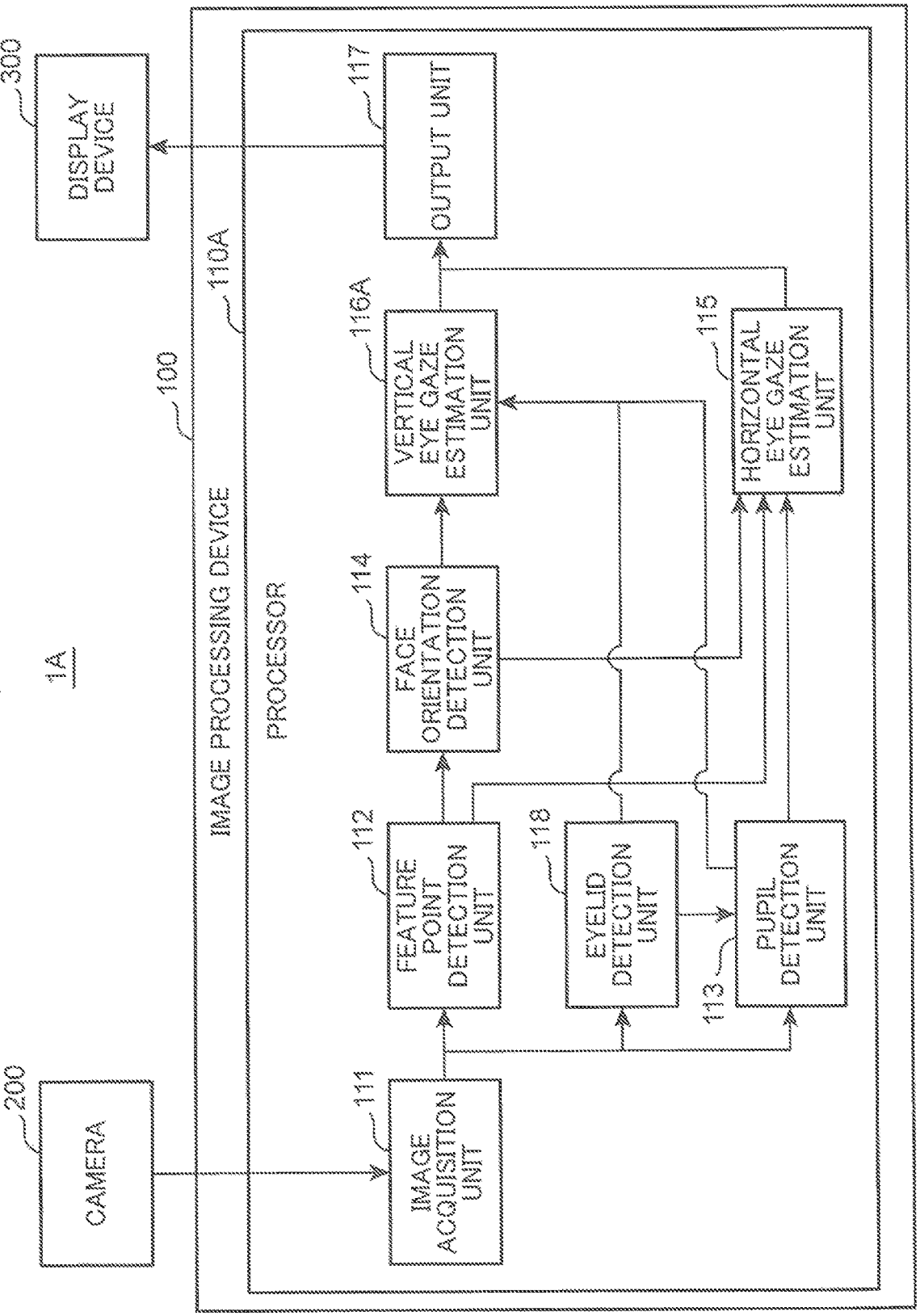
FIG. 15 is a view showing an example of an overall configuration of an image processing system according to a second embodiment of the present disclosure.

The second embodiment is characterized in that the vertical component of the eye gaze direction is obtained in consideration of the upper eyelid and the lower eyelid. FIG. 15 is a view showing an example of an overall configuration of an image processing system 1A according to the second embodiment of the present disclosure. In the following description, differences from the first embodiment will be mainly described. A processor 110A further includes an eyelid detection unit 118. Since a vertical eye gaze estimation unit 116A has processing contents different from those of the vertical eye gaze estimation unit 116 of the first embodiment, A is added to the end of the reference numeral.

The eyelid detection unit 118 applies eyelid detection processing described later to the image data acquired by the image acquisition unit 111 to detect the position of the upper eyelid and the position of the lower eyelid.

The vertical eye gaze estimation unit 116A detects the third distance between the center position of the pupil input by the pupil detection unit 113 and the position of the upper eyelid input by the eyelid detection unit 118, and the fourth distance between the center position of the pupil and the lower eyelid input by the eyelid detection unit 118. The vertical eye gaze estimation unit 116A estimates a vertical component of the pupil direction based on a ratio between the third distance and the fourth distance. The vertical eye gaze estimation unit 116A estimates the vertical component of the eye gaze direction by synthesizing the vertical component of the pupil direction and the vertical component of the orientation of the face detected by the face orientation detection unit 114.

Figure 16:
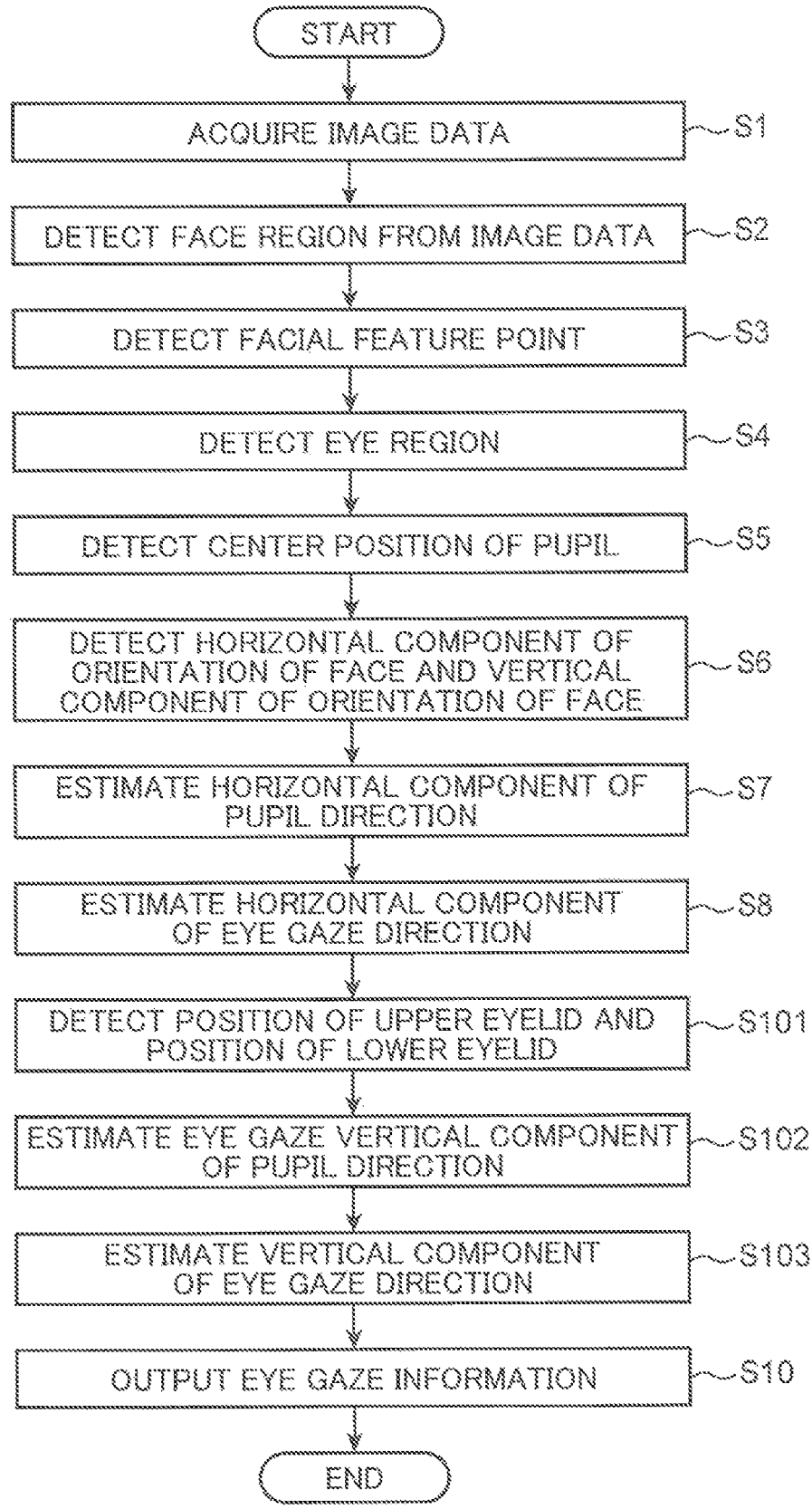
FIG. 16 is a flowchart showing an example of an operation of an image processing system according to the second embodiment.

Next, the operation of the image processing system 1A will be described. FIG. 16 is a flowchart showing an example of the operation of the image processing system 1A according to the second embodiment. In FIG. 16, the same processing as that in FIG. 4 is given the same processing number.

Figure 17:
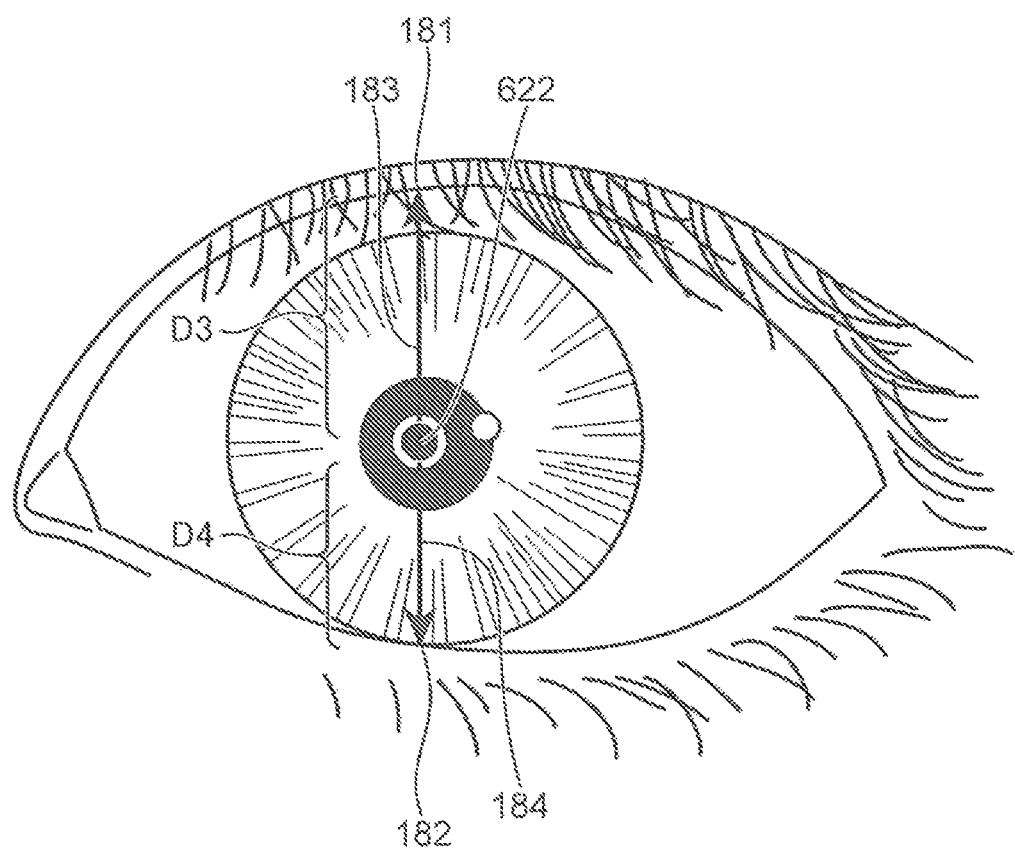
FIG. 17 is an explanatory view of eyelid detection processing.

In step S101 following step S8, the eyelid detection unit 118 applies the eyelid detection processing to the eye region 50 to detect the position of the upper eyelid and the position of the lower eyelid. Details of the eyelid detection processing will be described below. FIG. 17 is an explanatory view of the eyelid detection processing.

The eyelid detection unit 118 uses the eye region 50 before binarization. First, the eyelid detection unit 118 sets the center position 622 of the pupil detected in step S5 with respect to the eye region 50. Next, the eyelid detection unit 118 sets an upper vertical line 183 parallel to the Y axis above the center position 622 of the pupil. Next, the eyelid detection unit 118 searches from the center position 622 of the pupil toward the upper eyelid on the upper vertical line 183 for a position where the change to a bright side in luminance is maximized, and detects, as an upper eyelid position 181, the position where the change is maximized. The eyelid detection unit 118 that has detected the upper eyelid position 181 sets a lower vertical line 184 parallel to the Y axis below the center position 622 of the pupil. Then, the eyelid detection unit 118 searches from the center position 622 of the pupil toward the lower eyelid on the lower vertical line 184 for a position where the change to a bright side in luminance is maximized, and detects, as a lower eyelid position 182, the position where the change is maximized. Note that processing using the iris outer edge detection processing in Daugman algorithm is used as details of this search processing.

Refer back to FIG. 16. In step S102, the vertical eye gaze estimation unit 116A estimates the vertical component of the pupil direction using the upper eyelid position 181 and the lower eyelid position 182 detected in step S101.

Refer again to FIG. 17. The vertical eye gaze estimation unit 116A detects a third distance D3, which is a distance in the vertical direction from the center position 622 of the pupil to the upper eyelid position 181. The vertical eye gaze estimation unit 116A detects a fourth distance D4, which is a distance in the vertical direction from the center position 622 of the pupil to the lower eyelid position 182.

The vertical eye gaze estimation unit 116A calculates a ratio γ of the third distance D3 where the distance in the vertical direction from the upper eyelid position 181 to the lower eyelid position 182 is set to 100%. Here, the ratio γ when the pupil is oriented to the front direction is set as a reference ratio (e.g., 0.6), and the upward direction is set to be positive. In this case, the ratio γ decreases from the reference ratio as the pupil moves upward. The ratio γ increases more than the reference ratio as the pupil moves downward. Therefore, the vertical eye gaze estimation unit 116A estimates, as the vertical component of the pupil direction, a value obtained by subtracting the ratio γ from the reference ratio. Thus, the value of the vertical component of the pupil direction increases in the plus direction as the pupil moves upward, and the value of the vertical component of the pupil direction increases in the minus direction as the pupil moves downward.

In step S103, the vertical eye gaze estimation unit 116A synthesizes the vertical component of the orientation of the face detected in step S6 and the vertical component of the pupil direction estimated in step S102 to estimate the vertical component of the eye gaze direction. For example, the vertical component of the eye gaze direction is calculated by weighting and adding the vertical component of the orientation of the face and the vertical component of the pupil direction using a predetermined weighting coefficient. However, this is an example, and the vertical component of the eye gaze direction may be calculated by adding the vertical component of the orientation of the face and the vertical component of the pupil direction without weighting.

Thus, according to the present embodiment, since the vertical component of the eye gaze direction is estimated in consideration of the vertical component of the pupil direction, the detection accuracy of the eye gaze direction can be further improved.

Figure 18:
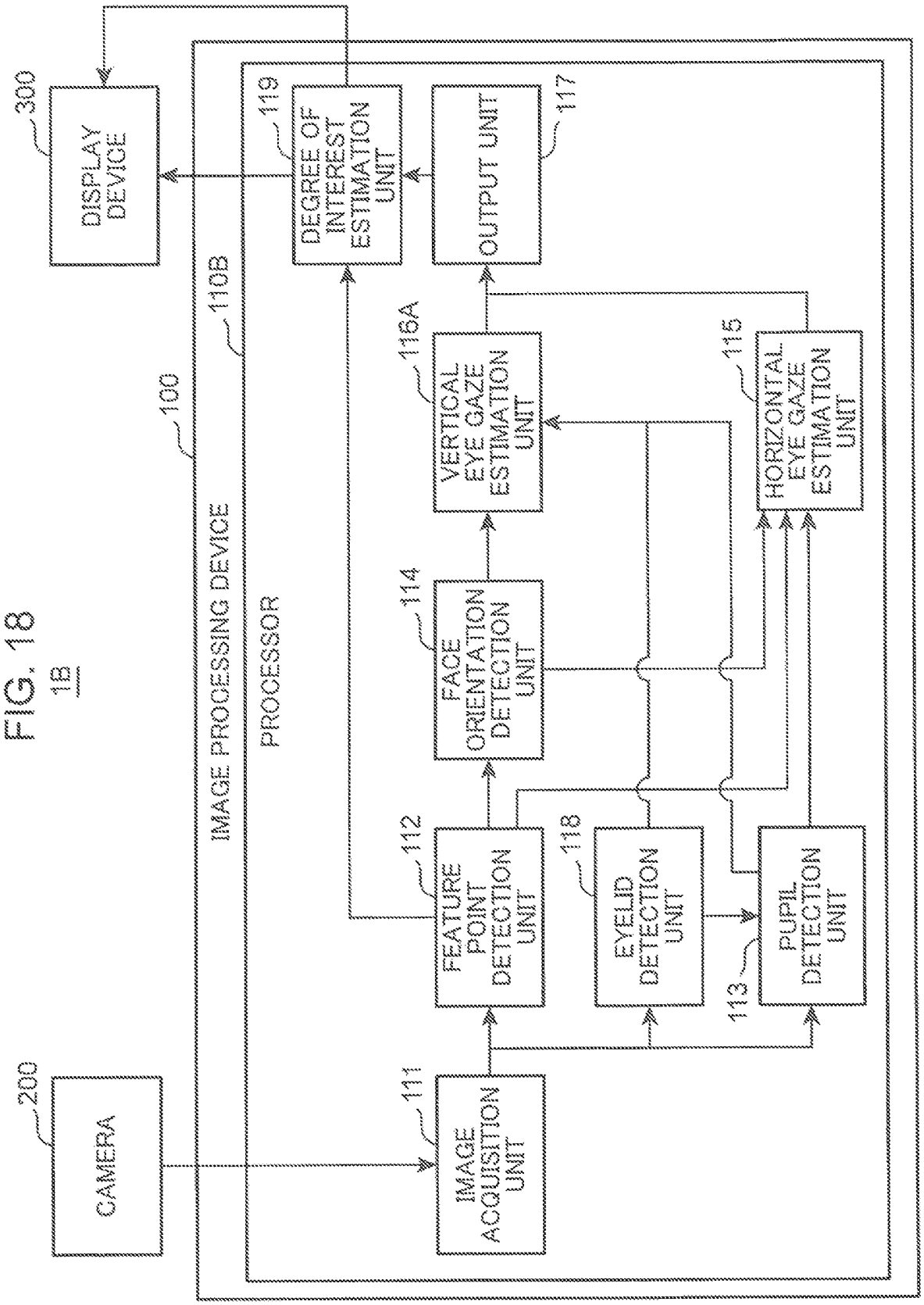
FIG. 18 is a block diagram showing a detailed configuration of an image processing system according to a third embodiment.

Third Embodiment in the third embodiment, the degree of interest of the person 400 is estimated. FIG. 18 is a block diagram showing a detailed configuration of an image processing system 1B according to the third embodiment. In the present embodiment, identical components as those in the first and second embodiments are given identical reference numerals, and description thereof will be omitted. Furthermore, in FIG. 18, a block having an identical name as that in FIG. 2 but having a different function is given a reference sign B at the end.

A processor 110B further includes a degree of interest estimation unit 119. The degree of interest estimation unit 119 estimates the degree of interest of the person 400 by the following processing. First, the degree of interest estimation unit 119 detects an eyebrow and a corner of the mouth from the face region 40 using the facial feature point 9X detected by the feature point detection unit 112. Here, the degree of interest estimation unit 119 is only required to detect the eyebrow and the corner of the mouth by specifying the feature points 9X to which the landmark point numbers respectively corresponding to the eyebrow and the corner of the mouth am imparted among the facial feature points 9X detected by the feature point detection unit 112.

Next, the degree of interest estimation unit 119 estimates the degree of interest of the person 400 based on the eye gaze information input from the output unit 117 and the position of the eyebrow and the position of the corner of the mouth having been detected, and outputs the degree of interest to the display device 300. Specifically, the degree of interest estimation unit 119 acquires, from a memory (not illustrated) for example, pattern data in which standard positions of the eyebrow and the corner of the mouth when a person puts on various expressions such as joy, surprise, anger, sadness, and blankness am described in advance. Then, the degree of interest estimation unit 119 collates the detected positions of the eyebrow and the corner of the mouth of the person 400 with the pattern data, and estimates the expression of the person 400. Using the estimated expression of the person 400 and the eye gaze indicated by the eye gaze information, the degree of interest estimation unit 119 specifies as to what expression the person 400 has made when the eye gaze of the person 400 is in which direction or the eye gaze point of the person 400 is present in which position. That is, the degree of interest estimation unit 119 specifies, as the degree of interest of the person 400, data in which the eye gaze information of the person 400 and the expression of the person 400 are associated with each other. Here, the degree of interest estimation unit 119 is described here to estimate the degree of interest based on the eyebrow and the corner of the mouth, but this is an example, and the degree of interest may be estimated based on one of the eyebrow and the corner of the mouth.

As described above, according to the present embodiment, since the degree of interest of the person 400 is estimated by further using the eyebrow and the corner of the mouth in addition to the eye gaze information, the degree of interest can be estimated with higher accuracy as compared with the degree of interest estimation based only on the eye gaze information.

Modifications (1) if an infrared light camera is adopted as the camera 200, the infrared light camera is only required to be an infrared light camera using infrared light in a predetermined second wavelength band in which the spectral intensity of sunlight is attenuated more than a predetermined first wavelength. The predetermined first wavelength is, for example, 850 nm. The predetermined second wavelength is, for example, 940 nm. The second wavelength band does not include, for example, 850 nm and is a band having a predetermined width with 940 nm as a reference (e.g., the center). As an infrared light camera that captures near-infrared light, one that uses infrared light of 850 nm is known. However, since the spectral intensity of sunlight is not sufficiently attenuated at 850 nm, there is a possibility that highly accurate eye gaze detection cannot be performed outdoors where the spectral intensity of sunlight is strong. Therefore, as an infrared light camera, the present disclosure employs a camera that uses infrared light in a band of 940 nm, for example. This makes it possible to perform highly accurate eye gaze detection even outdoors where the spectral intensity of sunlight is strong. Here, the predetermined second wavelength is 940 nm, but this is an example, and may be a wavelength slightly shifted from 940 nm. Note that the infrared light camera using the infrared light of the second wavelength is, for example, a camera including a light projector that irradiates with the infrared light of the second wavelength.

(2) In the above embodiment, the eye gaze information is described to include the coordinate data indicating the eye gaze point, but the present disclosure is not limited thereto. For example, the eye gaze information may include coordinate data indicating an eye gaze plane that is a region having a predetermined shape (e.g., a circle, a quadrangle, or the like) with a predetermined size with the eye gaze point as a reference (e.g., the center). This makes it possible to appropriately determine the eye gaze target object without depending on the distance between the person 400 and the eye gaze target object or the size of the eye gaze target object.

INDUSTRIAL APPLICABILITY

Since the present disclosure can detect eye gaze information with high accuracy, the present disclosure is useful in iris authentication using pupil information, estimation of a person's interest target using eye gaze information, estimation of a person's state, a user interface using an eye gaze, and the like.

The invention claimed is:

1. An image processing method in an image processing device, the image processing method comprising:
acquiring image data captured by an imaging device;
detecting a position of a facial feature point of a person from the image data;
detecting a center position of a pupil of an eye of the person from the image data;
detecting a horizontal component and a vertical component of an orientation of the face based on the position of the feature point;
estimating a horizontal component of an eye gaze direction of the person with respect to an optical axis of the imaging device based on the horizontal component of the orientation of the face and a distance between the center position of the pupil and the position of the feature point;

estimating a vertical component of the eye gaze direction based on at least the vertical component of the orientation of the face; and outputting eye gaze information including the horizontal component and the vertical component of the eye gaze direction, wherein the feature point includes an outer corner of the eye and an inner corner of the eye of the person, in estimation of the horizontal component of the eye gaze direction, a horizontal component of a pupil direction that is a direction of the pupil with respect to the orientation of the face is estimated based on a first ratio of a first distance between the center position of the pupil and a position of the outer corner of the eye with respect to a distance between the outer corner of the eye and the inner corner of the eye and a second ratio of a second distance between the center position of the pupil and a position of the inner corner of the eye with respect to the distance between the outer corner of the eye and the inner corner of the eye, and the horizontal component of the eye gaze direction is estimated by synthesizing the horizontal component of the orientation of the face and the horizontal component of the pupil direction, and in estimation of the horizontal component of the eye gaze direction, it is determined that the pupil of a right eye is set on the right in response to the first ratio being smaller than the second ratio and the pupil of the right eye is set on the left in response to the second ratio being smaller than the first ratio.

2. The image processing method according to claim 1, wherein the feature point includes at least one of an eyebrow and a corner of a mouth, and a degree of interest of the person is estimated based on the eye gaze information and at least one of a position of the eyebrow and a position of the corner of the mouth.

3. The image processing method according to claim 2, comprising:

estimating an expression of the person based on at least one of the position of the eyebrow and the position of the corner of the mouth, and estimating the degree of interest of the person based on the eye gaze information and information indicating the estimated expression.

4. The image processing method according to claim 1, wherein the eye gaze information includes information indicating an eye gaze plane that is a region of a predetermined range with respect to an eye gaze point of the person on a predetermined target plane.

5. The image processing method according to claim 1, wherein the image data is captured by a visible light camera, and the center position of the pupil is a center position of an iris.

6. The image processing method according to claim 1, wherein the image data is captured by an infrared light camera, and the center position of the pupil is a center position of a pupil outer edge.

7. The image processing method according to claim 1, wherein the image data is image data captured by an infrared light camera using infrared light in a predetermined second wavelength band in which a spectral intensity of sunlight is attenuated more than a predetermined first wavelength.

8. An image processing device comprising:

an acquisition unit that acquires image data captured by an imaging device;

a feature point detection unit that detects a position of a facial feature point of a person from the image data;

a pupil detection unit that detects a center position of a pupil of an eye of the person from the image data;

a face orientation detection unit that detects a horizontal component and a vertical component of an orientation of the face based on the position of the feature point;

a horizontal eye gaze estimation unit that estimates a horizontal component of an eye gaze direction of the person with respect to an optical axis of the imaging device based on the horizontal component of the orientation of the face and a distance between the center position of the pupil and the position of the feature point;

a vertical eye gaze estimation unit that estimates a vertical component of the eye gaze direction based on at least the vertical component of the orientation of the face; and an output unit that outputs eye gaze information including the horizontal component and the vertical component of the eye gaze direction wherein the feature point includes an outer corner of the eye and an inner corner of the eye of the person, the horizontal eye gaze estimation unit estimates a horizontal component of a pupil direction that is a direction of the pupil with respect to the orientation of the face based on a first ratio of a first distance between the center position of the pupil and a position of the outer corner of the eye with respect to a distance between the outer corner of the eye and the inner corner of the eye and a second ratio of a second distance between the center position of the pupil and a position of the inner corner of the eye with respect to the distance between the outer corner of the eye and the inner corner of the eye, and estimates the horizontal component of the eye gaze direction by synthesizing the horizontal component of the orientation of the face and the horizontal component of the pupil direction, and the horizontal eye gaze estimation unit determines that the pupil of a right eye is set on the right in response to the first ratio being smaller than the second ratio and the pupil of the right eye is set on the left in response to the second ratio being smaller than the first ratio.

9. A non-transitory computer readable storage medium storing an image processing program that causes a computer to function as an acquisition unit that acquires image data captured by an imaging device, a feature point detection unit that detects a position of a facial feature point of a person from the image data, a pupil detection unit that detects a center position of a pupil of an eye of the person from the image data, a face orientation detection unit that detects a horizontal component and a vertical component of an orientation of the face based on the position of the feature point, a horizontal eye gaze estimation unit that estimates a horizontal component of an eye gaze direction of the person with respect to an optical axis of the imaging device based on the horizontal component of the orientation of the face and a distance between the center position of the pupil and the position of the feature point, a vertical eye gaze estimation unit that estimates a vertical component of the eye gaze direction based on at least the vertical component of the orientation of the face, and
an output unit that outputs eye gaze information including the horizontal component and the vertical component of the eye gaze direction
wherein the feature point includes an outer corner of the eye and an inner corner of the eye of the person,
the horizontal eye gaze estimation unit estimates a horizontal component of a pupil direction that is a direction of the pupil with respect to the orientation of the face based on a first ratio of a first distance between the center position of the pupil and a position of the outer corner of the eye with respect to a distance between the outer corner of the eye and the inner corner of the eye and a second ratio of a second distance between the center position of the pupil and a position of the inner corner of the eye with respect to the distance between the outer corner of the eye and the inner corner of the eye, and estimates the horizontal component of the eye gaze direction by synthesizing the horizontal component of the orientation of the face and the horizontal component of the pupil direction, and
the horizontal eye gaze estimation unit determines that the pupil of a right eye is set on the right in response to the first ratio being smaller than the second ratio and the pupil of the right eye is set on the left in response to the second ratio being smaller than the first ratio.

\* \* \* \* \*